(12) United States Patent
Hongo

(10) Patent No.: US 8,477,399 B2
(45) Date of Patent: Jul. 2, 2013

(54) OPTICAL DEVICE AND OPTICAL APPARATUS

(75) Inventor: Kazuhiro Hongo, Kanagawa (JP)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 12/832,666

(22) Filed: Jul. 8, 2010

(65) Prior Publication Data

US 2011/0013251 A1 Jan. 20, 2011

(30) Foreign Application Priority Data

Jul. 17, 2009 (JP) .................................. 2009-169344
Oct. 15, 2009 (JP) .................................. 2009-238114

(51) Int. Cl.
*G02F 1/00* (2006.01)
*G02F 1/01* (2006.01)
*H01S 3/00* (2006.01)

(52) U.S. Cl.
USPC ........................... 359/237; 359/240; 359/342

(58) Field of Classification Search
USPC ................... 359/237, 238, 240, 342
See application file for complete search history.

(56) References Cited

U.S. PATENT DOCUMENTS

2007/0253051 A1* 11/2007 Ishihara et al. ............... 359/212

FOREIGN PATENT DOCUMENTS

| JP | 3956939 | 5/2007 |
| JP | 2009-026360 | 2/2009 |

OTHER PUBLICATIONS

Tsutomu Ishi et al.; Si Nano-Phtodiode with a Surface Plasmon Antenna; Japanese Journal of Applied Physics; vol. 44, No. 12; 2005; pp. L 364-L 366.

* cited by examiner

*Primary Examiner* — William Choi
(74) *Attorney, Agent, or Firm* — Dentons US LLP

(57) ABSTRACT

An optical device includes: a base that transmits incident light; and a first conductive film formed on one surface of the base, and that includes an indentation pattern of a predetermined period formed on a base-side surface, wherein a side portion defining an edge portion irradiated with the incident light has a form of a protrusion or a straight line as viewed from the incident side of the incident light.

12 Claims, 29 Drawing Sheets

COMPARATIVE EXAMPLE 1

COMPARATIVE EXAMPLE 1

OPTICAL DEVICE AND OPTICAL APPARATUS

BACKGROUND OF THE INVENTION

1. Field of the Invention

The present invention relates to optical devices, and optical apparatuses provided therewith, specifically to optical devices capable of producing light of a micro spot size, for example, such as near-field light, and optical apparatuses provided with such optical devices.

2. Description of the Related Art

Various techniques that use light of a micro spot size, for example, such as near-field light, as recording light have been proposed to realize high-density recording in an information recording medium. Because the use of near-field light realizes a micro light spot that exceeds the diffraction limit of light, for example, a thermal assist magnetic recording technique that uses near-field light has gained attention as a promising technique for the next-generation high-density magnetic recording. Further, various techniques that use near-field light for an information recording medium that uses a magneto-optical recording film or a phase-change recording film have been studied.

In this connection, various types of optical devices that produce light of a micro spot size, for example, such as near-field light, have been proposed (see, for example, Japanese Patent No. 3956939, Patent Document 1; and JP-A-2009-26360, Patent Document 2).

Patent Document 1 proposes an optical device that includes an optical device main body, and a conductive film formed on a surface of the optical device main body. A circular aperture is formed at the center of the conductive film. In the optical device disclosed in this publication, light is shone on the conductive film through the optical device main body to produce surface plasmons at the aperture edge of the conductive film, and light of a micro spot size substantially equal to the size of the circular aperture is emitted through the circular aperture.

Further, in Patent Document 1, periodic indentations are formed on the surface of the conductive film on the side of the optical device main body, and the surface plasmon enhancement effect produced by the indentations is utilized to improve the transmission efficiency through the circular aperture. Further, Patent Document 1 specifies the relationship between the beam size of the incident light and the periodic structure of the conductive film surface to improve the transmission efficiency through the circular aperture of the conductive film. Patent Document 1 also proposes an optical head and an optical recording and reproducing apparatus that include an optical device of the configuration described above.

Patent Document 2 proposes an optical device of a configuration similar to that described in Patent Document 1. In Patent Document 2, in order to improve transmission efficiency through the circular aperture of the conductive film, the aperture size is varied stepwise along the axial direction of the circular aperture so as to minimize the size of the circular aperture in the vicinity of the portion from which the light emerges.

Further, a technique has been proposed concerning a photodiode that is configured using an optical device that utilizes the surface plasmon enhancement effect (see, for example, Tsutomu Ishi et al.: Si Nano-Photodiode with a Surface Plasmon Antenna, JJAP vol. 44, No. 12, 2005, pp. L364-L366, Non-Patent Document 1).

SUMMARY OF THE INVENTION

As described above, optical devices that utilize surface plasmons as proposed in, for example, Patent Documents 1 and 2 have gained attention as a promising technique that has potential in a wide variety of applications. Accordingly, there is a need for the development of an optical device that utilizes surface plasmons for improved output intensity (improved efficiency of utilizing the power of the incident light).

Thus, it is desirable to improve the efficiency of utilizing the power of incident light in an optical device that utilizes surface plasmons.

According to an embodiment of the present invention, there is provided an optical device that includes a base that transmits incident light, and a first conductive film formed on one surface of the base. The first conductive film includes an indentation pattern of a predetermined period formed on a base-side surface, wherein a side portion defining an edge portion irradiated with the incident light has a form of a protrusion or a straight line as viewed from the incident side of the incident light.

In the optical device of the embodiment of the present invention, light of a spot size smaller than the wavelength of the incident light is produced in the vicinity of the edge portion of the first conductive film upon irradiation of the incident light. Here, because the side portion defining the edge portion of the first conductive film has a form of a protrusion or a straight line as viewed from the incident side of the incident light, a propagation loss of the surface plasmons at the edge region of the first conductive film can be reduced. Thus, the optical device of the embodiment of the present invention is capable of producing light of improved intensity, as will be described later in detail.

An optical apparatus according to another embodiment of the present invention includes the optical device of the embodiment of the embodiment of the present invention, and a light source disposed on the surface of the base of the optical device opposite from the conductive film, and that emits the incident light.

An optical apparatus according to still another embodiment of the present invention includes the optical device of the embodiment of the embodiment of the present invention, and a light receiving section that receives the light emitted by the optical device.

As described above, the optical device of the embodiment of the present invention is capable of producing light of a spot size smaller than the wavelength of the incident light at the edge portion of the first conductive film. In the embodiment of the present invention, a propagation loss of surface plasmons at the edge portion of the first conductive film can be reduced. Thus, with the embodiments of the present invention, light of a spot size smaller than the wavelength of the incident light can be produced, and the output intensity can be increased to further improve the efficiency of utilizing the power of the incident light.

DESCRIPTION OF THE PREFERRED EMBODIMENTS

The following describes exemplary configurations of optical devices according to embodiments of the present invention, and exemplary configurations of optical apparatuses including the optical device with reference to the accompanying drawings, in the following order. The invention is not limited by the descriptions below.

1. First Embodiment: Exemplary basic configuration of the optical device

2. Second Embodiment: Another exemplary configuration of the optical device

3. Third Embodiment: Exemplary configuration of a recording and reproducing apparatus including an optical device of an embodiment of the present invention 4. Fourth Embodiment: Exemplary configuration of a photodetector including an optical device of an embodiment of the present invention

1. First Embodiment

Before explaining a specific exemplary configuration of an optical device according to First Embodiment of the present invention, the optical device of the configuration proposed in, for example, Patent Document 1, is described first with regard to the problems found by the inventor of the present invention.

Figure 1A:
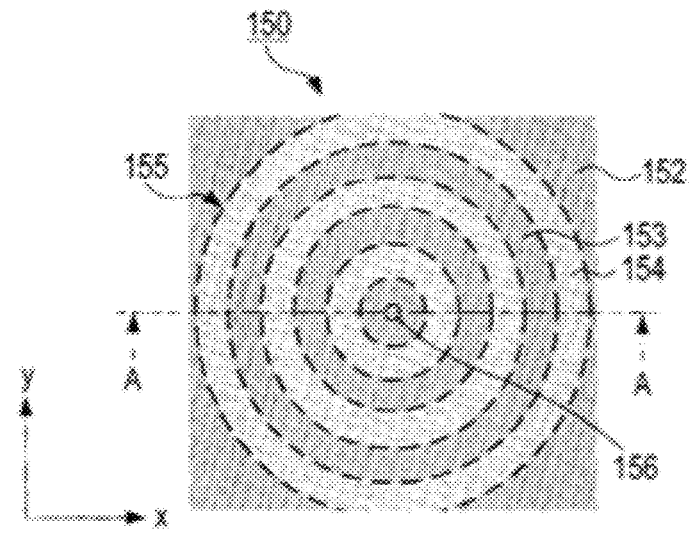
FIG. 1A is a schematic bottom view of an optical device of related art.
Figure 1B:
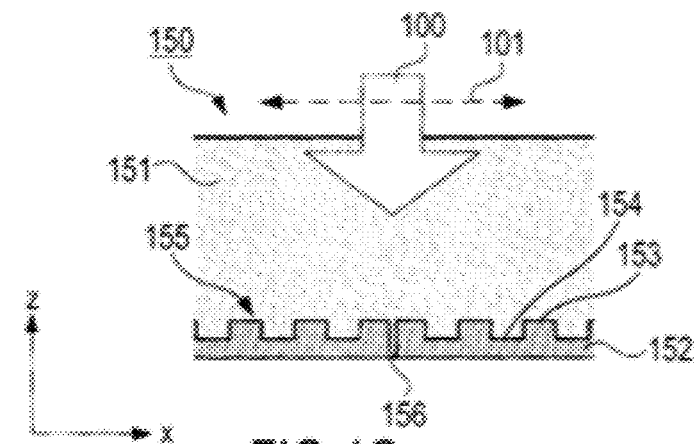
FIG. 1B is a cross sectional view taken at A-A of FIG. 1A.
Figure 1C:
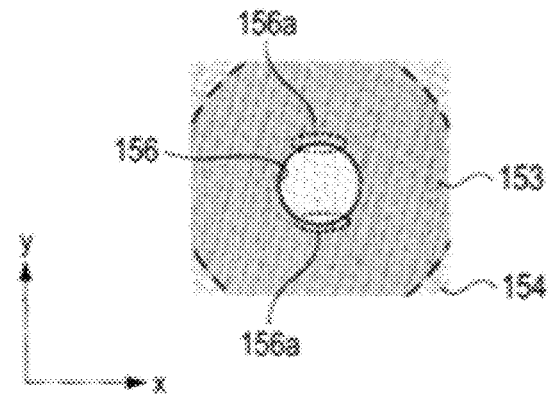
FIG. 1C is an enlarged bottom view in the vicinity of a circular aperture of the optical device.

FIGS. 1A to 1C illustrate a schematic configuration of the optical device proposed in, for example, Patent Document 1. FIG. 1A is a bottom view of an optical device 150, and FIG. 1B is a cross sectional view at A-A of FIG. 1A. FIG. 1C is an enlarged view near a circular aperture 156 of the optical device 150. For ease of explanation, FIGS. 1A and 1B only illustrate regions of a conductive film 152 (described later) where an indentation pattern 155 is formed.

As illustrated in FIGS. 1A and 1B, the optical device 150 proposed in, for example, Patent Document 1 is configured to mainly include a base 151, and a conductive film 152 formed on one of the surfaces of the base 151. A circular aperture 156 of a diameter smaller than the spot size of incident light 100 (propagation light) is formed at the center of the conductive film 152. The surface of the conductive film 152 on the side of the base 151 has an indentation pattern 155 of a predetermined period that originates from the edge of the circular aperture 156 as a reference point.

The indentation pattern 155 includes annular raised portions 153, and annular recessed portions 154. The raised portions 153 and the recessed portions 154 are alternately disposed concentrically to the center of the circular aperture 156. As used herein, the raised portions of the indentation pattern formed on the conductive film are portions of the conductive film that are upward toward the incident side of incident light, and the recessed portions of the indentation pattern are portions of the conductive film that are downward from the incident side of incident light.

In the optical device 150 illustrated in FIGS. 1A to 1C, upon incidence of the incident light 100 on the conductive film 152 through the base 151, light having a spot size that substantially matches the diameter of the circular aperture 156 is emitted through the circular aperture 156. Here, the quantity of transmitted light through the circular aperture 156 increases by the surface plasmon enhancement effect produced by the indentation pattern 155 of the conductive film 152 (transmission efficiency is increased). In the example of FIGS. 1A to 1C, the incident light 100 is linearly-polarized light, and the polarization direction 101 is a predetermined in-plane direction of the conductive film 152, specifically the x direction in FIGS. 1A to 1C.

A range of verification experiments conducted by the inventor of the present invention using the optical device 150 of the foregoing configuration revealed that the quantity of transmitted light through the circular aperture 156 abruptly decreases (attenuates) when the diameter of the circular aperture 156 is reduced to, for example, 1/10 or smaller (about several ten nanometers) of the wavelength of the incident light 100. In other words, the experiments found that the emission of high intensity light with a spot size of about several ten nanometers is difficult to achieve with the optical device 150 of FIGS. 1A to 1C. This phenomenon will be described in more detail in Comparative Example 1 below.

The abrupt decrease in the quantity of transmitted light through the circular aperture 156 can be attributed to not only the reduced diameter of the circular aperture 156 but an increased propagation loss in the surface plasmons at the edge portion defining the circular aperture 156. Specifically, upon incidence of the incident light 100 polarized in a predetermined direction as illustrated in FIG. 1B, surface plasmons occur on the wall surface of the conductive film 152 orthogonal to the polarization direction 101 of the incident light 100, and do not occur on the metallic wall surface substantially parallel to the polarization direction 101. It is therefore believed that metal wall portions 156a of the circular aperture 156 (portions surrounded by broken lines in FIG. 1C) substantially parallel to the polarization direction 101 of the incident light 100 do not contribute to the surface plasmon enhancement effect, but instead obstruct the propagation of the surface plasmons. Thus, upon incidence of the incident light 100 of a predetermined polarization direction, the reduced size of the circular aperture 156 is believed to increase the propagation loss of the surface plasmons at the edge portion of the circular aperture 156 substantially parallel to the polarization direction 101, and thus abruptly decreases the quantity of transmitted light through the circular aperture 156.

The power of the incident light 100 needs to be increased to suppress such a decrease in the quantity of transmitted light. However, increasing the power of the incident light 100 with the optical device 150 of FIGS. 1A to 1C used in, for example, a recording and reproducing apparatus causes the following problems. Increased power means an increased quantity of the incident light required to bring a recording medium to a recordable temperature, and thus increases the power consumption. Further, the temperature increase in the conductive film is detrimental to reliability. The present embodiment will now be described with regard to an exemplary configuration of an optical device capable of solving these problems, and that can emit light of a micro spot size of, for example, about several ten nanometers with increased intensity.

[Configuration of Optical Device]

Figure 2A:
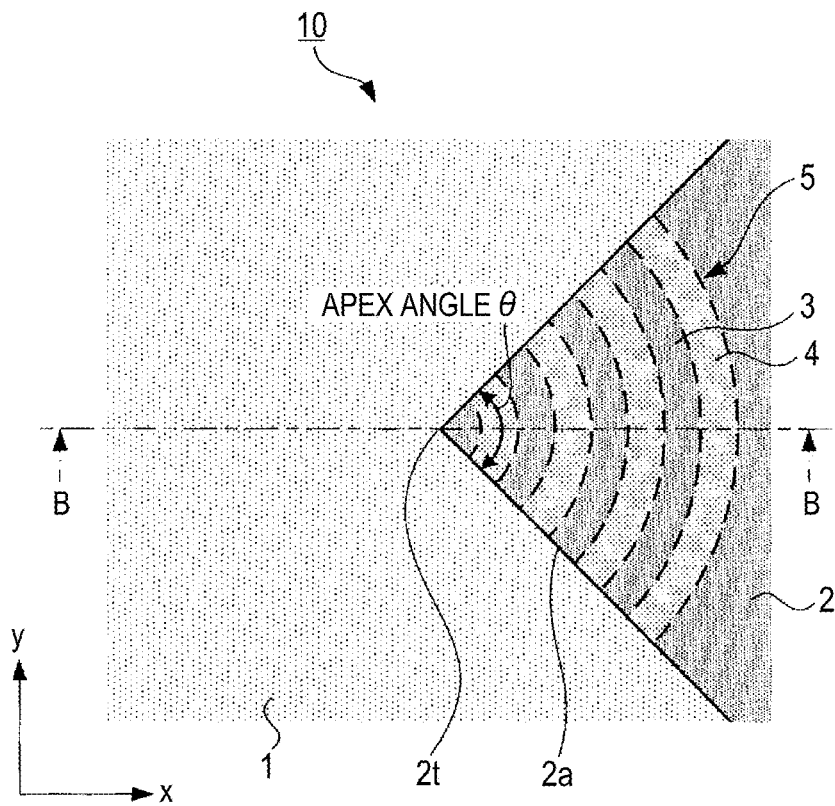
FIG. 2A is a schematic bottom view of an optical device according to First Embodiment.
Figure 2B:
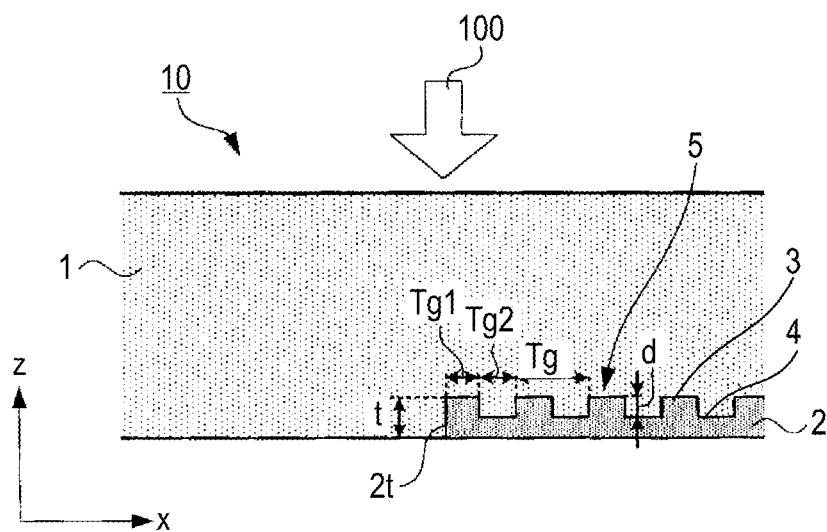
FIG. 2B is across sectional view taken at B-B of FIG. 2A.

FIGS. 2A and 2B illustrate a schematic configuration of the optical device of the present embodiment. FIG. 2A is a schematic bottom view of the optical device of the present embodiment, and FIG. 2B is a cross sectional view at B-B of FIG. 2A. For ease of explanation, FIGS. 2A and 2B illustrate only regions of a conductive film 2 (described later) where an indentation pattern 5 is formed.

An optical device 10 is configured to include mainly a base 1, and a conductive film 2 (first conductive film) formed in a portion of the base 1 on one of the base surfaces. In the optical device 10 of the present embodiment, incident light 100 from a light source (not illustrated) is shone on the conductive film 1 via the base 1.

The base 1 is a plate-like light transmissive member. Any material can be used for the base 1 as long as it is light transmissive in the wavelength range of the incident light 100 used. Particularly, materials with a transmittance of about 70% or more in the wavelength range of the incident light 100 are preferably used.

Specific examples of the material of the base 1 include oxide insulators such as $ZnO$, $Al_2O_3$, $SiO_2$, $TiO_2$, $CrO_2$, and $CeO_2$, nitride insulators such as $SiN$, and plastics. Further, group IV semiconductors such as Si and Ge, and group III-V compound semiconductors as represented by GaAs, AlGaAs, GaN, InGaN, InSb, GaSb, and AlN may be used as the material of the base 1, for example. It is also possible to use, for example, group II-VI compound semiconductors such as ZnTe, ZnSe, ZnS, and ZnO as the material of the base 1.

Preferably, materials with high heat conductivity are used as the material of the base 1. Materials with high heat conductivity diffuse the heat generated in the conductive film 2, and thus suppress temperature increase in the conductive film 2.

The conductive film 2 is a metallic film in which the side portions defining an edge portion (edge) 2a (hereinafter, simply edge portion (edge) 2a) have a form of a protrusion as viewed from the incident side of the incident light 100. In the present embodiment, the edge portion 2a of the conductive film 2 has the shape of the letter L (triangular) with apex angle θ as viewed from the incident side of the incident light 100, as illustrated in FIG. 2A. In other words, the two side portions that extend out from an end portion 2t of the edge portion 2a are linear. Further, the side portions defining the edge portion 2a are formed symmetrical about the direction (x direction in FIG. 2A) orthogonal to the tangential direction (y direction in FIG. 2A) of the end portion 2t of the conductive film 2. The length of the conductive film 2 along the direction (x direction in FIG. 2A) orthogonal to the tangential direction (y direction in FIG. 2A) of the end portion 2t of the conductive film 2 is greater than the maximum radius of the spot of the incident light 100.

An indentation pattern 5 of a predetermined period Tg is formed on the surface of the conductive film 2 on the base 1 side. The indentation pattern 5 includes arc-shaped raised portions 3 of a constant width (the innermost raised portion 3 is fan-shaped), and arc-shaped recessed portions 4 of a constant width. The raised portions 3 and the recessed portions 4 are alternately disposed, outwardly from the end portion 2t of the conductive film 2 in a concentric fashion. In the present embodiment, the innermost portion including the end portion 2t of the conductive film 2 is a raised portion 3. However, the present invention is not limited to this, and the innermost portion including the end portion 2t of the conductive film 2 may be configured as a recessed portion 4.

In the present embodiment, the origin of the periodic structure of the indentation pattern 5 is the end portion 2t of the conductive film 2. Thus, the indentation pattern 5 has a periodic structure in a direction normal to the boundary wall surfaces of the raised portions 3 and the recessed portions 4, specifically in a radial direction centered on the end portion 2t of the conductive film 2.

The indentation pattern 5 is configured so that the surface plasmons produced on the boundary wall surfaces of the raised portions 3 and the recessed portions 4 in the manner described below propagate in phase, and that the surface plasmons that propagate in this manner overlap in phase with the surface plasmon produced on the metallic wall surfaces that define the end portion 2t of the conductive film 2. Specifically, in the present embodiment, the period Tg of the indentation pattern 5, the width Tg1 and height t of the raised portions 3, and the width Tg2 and depth d of the recessed portions 4 are appropriately set so as to obtain the surface plasmon enhancement effect on the conductive film 2 (see FIG. 2B).

For example, the period Tg of the indentation pattern 5 are set so that the light intensity measured in the vicinity of the end portion 2t of the conductive film 2 becomes greater than that without the periodic structure (indentation pattern 5). The width Tg1 of the raised portions 3 and the width Tg2 of the recessed portions 4 may be the same or different. Further, in order to fully utilize the surface plasmon enhancement effect produced on the conductive film 2, it is preferable that the indentation pattern 5 be formed over a region equal to or greater than the spot radius of the incident light 100 with respect to the origin.

In the present embodiment, as illustrated in FIG. 2B, the surface of the conductive film 2 opposite from the base 1 is a flat surface in flush with the surface of the base 1 exposed on the conductive film 2 side.

The conductive film 2 of such a configuration can be formed as follows, for example. First, a recess is formed on a surface of the base 1 in a region where the conductive film 2 is to be formed. Then, an indentation pattern corresponding to the indentation pattern 5 is formed on the bottom surface of the recess. A metallic film is then laminated over the recess-side surface of the base 1. Thereafter, the metallic film is polished until the surface of the base 1 is exposed in regions other than the recess region.

Any material can be used for the conductive film 2, as long as it has desirable conductivity. Examples of such materials include metals (for example, such as Au, Ag, Pt, Cu, Al, Ti, W, Ir, Pd, Mg, and Cr), semiconductors (for example, such as Si and GaAs), and carbon nanotubes.

In the optical device 10 of the present embodiment, an interface later may be formed between the conductive film 2 and the base 1, in order to improve adhesion and reliability. In this case, it is preferable that the interface layer be sufficiently thinner than the conductive film 2. Materials, for example, such as Ti and Cr can be used for the interface layer.

When using the optical device 10 of the present embodiment for, for example, a recording and reproducing apparatus, a light transmissive film may be formed on a surface of the conductive film 2 to prevent damage caused by the contact with a recording medium during operation. In this case, it is preferable to use materials with high mechanical strength, for example, such as diamond-like carbon (DLC), as the material of the light transmissive film. The materials used to form the base 1 may also be used for the light transmissive film. In this case, the materials used for the base 1 and the light transmissive film may be the same or different.

Figure 3:
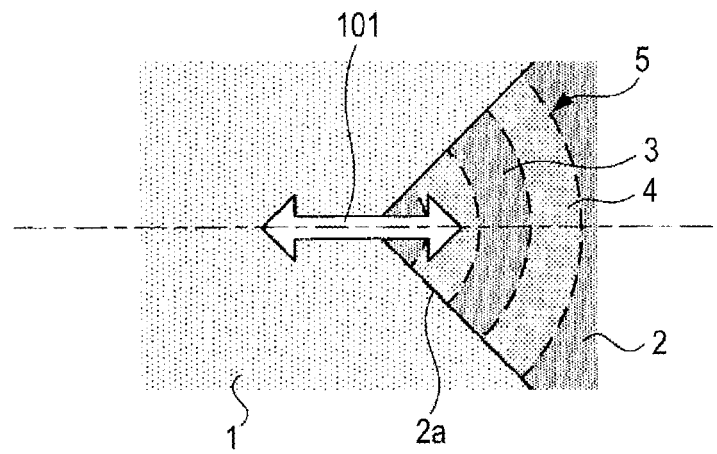
FIG. 3 represents the relationship between the period direction of an indentation pattern of a conductive film of the optical device of First Embodiment, and the polarization direction of incident light.

FIG. 3 represents the configuration of the indentation pattern 5 of the conductive film 2 in the optical device 10 of the present embodiment in relation to the polarization direction of the incident light 100. In the present embodiment, linearly-polarized light is used as the incident light 100, and the incident light 100 is incident in such a manner that the polarization direction 101 coincides with the direction (x direction in FIG. 3; hereinafter, "period direction") orthogonal to the tangential direction of the end portion 2t of the conductive film 2.

Aside from linearly-polarized light, any light can be used as the incident light 100 used for the optical device 10 of the present embodiment, as long as it has anisotropy in the direction of polarization. For example, elliptically polarized light may be used. In this case, incident light is shone in such a manner that the principal polarization direction of the incident light coincides with the period direction of the indentation pattern 5 of the conductive film 2. Further, circularly-polarized or randomly-polarized incident light may be used for the optical device 10 of the present embodiment. In this case, the period direction of the conductive film 2 can be set in any direction.

Figure 4:
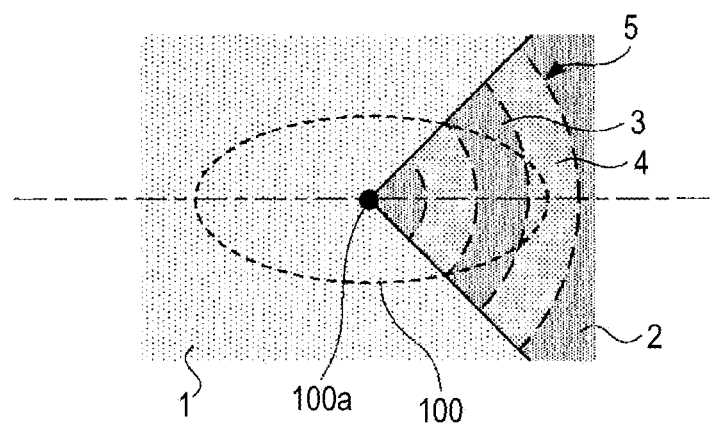
FIG. 4 represents an irradiation position of incident light on the optical device of First Embodiment.

FIG. 4 illustrates a preferred irradiation position of the incident light 100 in the optical device 10 of the present embodiment. In the present embodiment, because the strongest surface plasmon should be excited at the end portion 2t—the origin of the periodic structure of the indentation pattern 5 of the conductive film 2—, it is preferable that an intensity peak portion 100a (spot center) of the incident light 100 coincide with the end portion 2t of the conductive film 2.

When the spot shape of the incident light 100 has anisotropy, it is preferable to first decide conditions regarding the position of the intensity peak portion 100a of the incident light 100 (FIG. 4), and the direction of polarization (FIG. 3), before determining the configuration of the optical device 10 so to as maximize the light-receiving area of the conductive film 2.

[Principle of Micro Spot Size Light Production]

Figure 5:
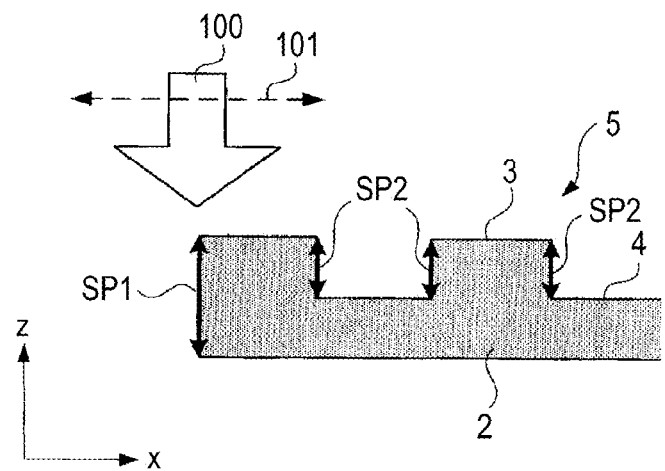
FIG. 5 is a view explaining the surface plasmon enhancement effect.
Figure 6:
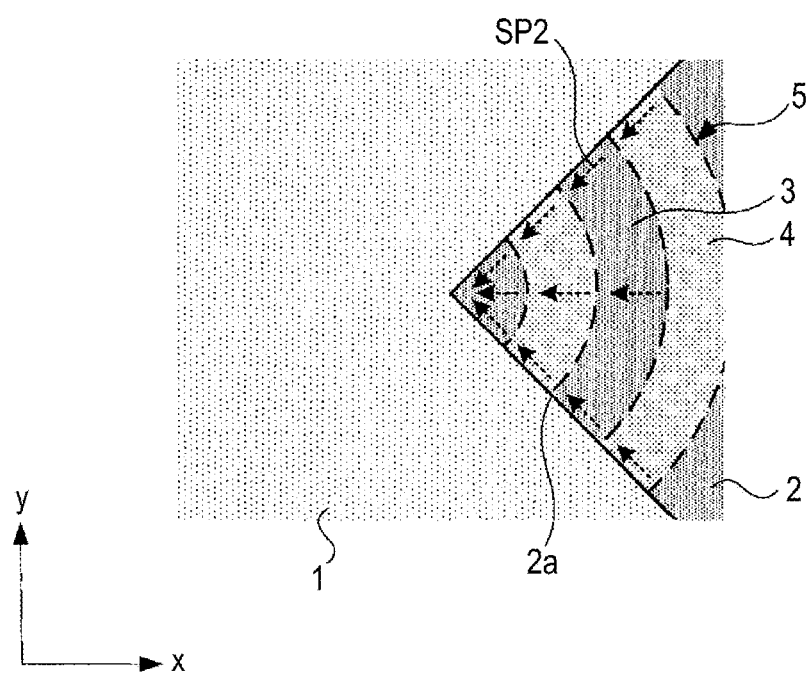
FIG. 6 is a view explaining the surface plasmon enhancement effect.

The principle by which high-intensity light of a micro spot size is produced in the optical device 10 of the present embodiment is described below with reference to FIG. 5 and FIG. 6. FIG. 5 illustrates how surface plasmons are produced on the conductive film 2. FIG. 6 illustrates how the surface plasmons produced on the conductive film 2 propagate on the surface of the conductive film 2.

When the electric field vector direction of the incident light 100 shone on the conductive film 2 via the base 1, or specifically the polarization direction 101 has a direction component in the normal vector to the surface of the conductive film 2, a charge according to the inner product of the electric field vector and the normal vector is induced on the surface of the conductive film 2. The induced charge produces surface plasmons on the surface of the conductive film 2 on the base 1 side.

When the indentation pattern 5 is formed on the surface of the conductive film 2 as in the present embodiment, a surface plasmon SP1 is induced on the metallic wall surfaces that define the end portion 2t of the conductive film 2, and surface plasmons SP2 are induced on the boundary wall surfaces of the raised portions 3 and the recessed portions 4, as illustrated in FIG. 5. The surface plasmons propagate on the surface of the conductive film 2 along a direction normal to the boundary wall surfaces of the raised portions 3 and the recessed portions 4, specifically along the radial direction centered on the end portion 2t of the conductive film 2. As illustrated in FIG. 6, the direction of surface plasmon propagation is not only outward from the end portion 2t of the conductive film 2, but inward towards the end portion 2t of the conductive film 2 (indicated by broken line arrows in FIG. 6).

As described above, in the present embodiment, the period Tg of the indentation pattern 5 is set so as to produce the surface plasmon enhancement effect on the surface of the conductive film 2. Thus, the surface plasmons SP2 produced on the boundary wall surfaces of the raised portions 3 and the recessed portions 4 propagate on the conductive film 2 in phase. The surface plasmons SP2 that propagate in this manner overlap in phase with the surface plasmon SP1 at the end portion 2t of the conductive film 2. As a result, a strong surface plasmon is produced at the end portion 2t of the conductive film 2 (surface plasmon enhancement effect), and high-intensity light of a micro spot size (for example, near-field light) is produced in the vicinity of the end portion 2t of the conductive film 2.

In this manner, in the optical device 10 of the present embodiment, high-intensity light of a micro spot size can be produced in the vicinity of the end portion 2t of the conductive film 2 by utilizing the surface plasmon enhancement effect that occurs on the surface of the conductive film 2.

Further, in the present embodiment, the conductive film 2 has essentially no edge region substantially parallel to the polarization direction 101 of the incident light 100 at the concentrated region of the surface plasmons (the end portion 2t of the conductive film 2). Thus, the propagation loss of the surface plasmons at the edge region substantially parallel to the polarization direction 101 of the incident light 100 as described in conjunction with the optical device 150 of FIGS. 1A to 1C can be greatly reduced in the present embodiment. In other words, with the optical device 10 of the present embodiment, the problems associated with the optical device 150 of FIGS. 1A to 1C can be solved, and light can be emitted with increased intensity.

[Intensity Distribution of Emitted Light]

Figure 7A:
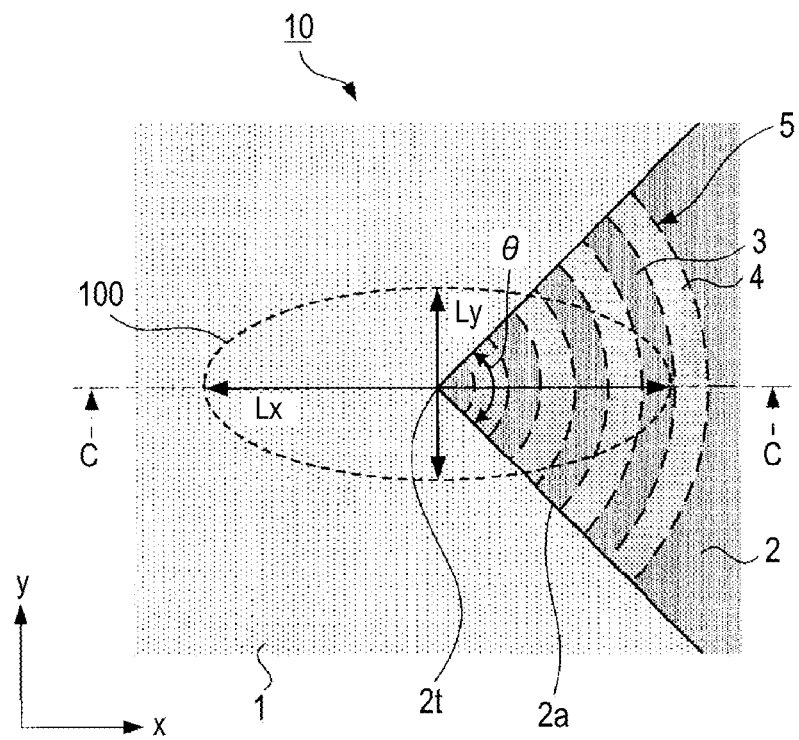
FIGS. 7A and 7B are views explaining the analysis model of a simulation analysis performed for the optical device of First Embodiment.
Figure 7B:
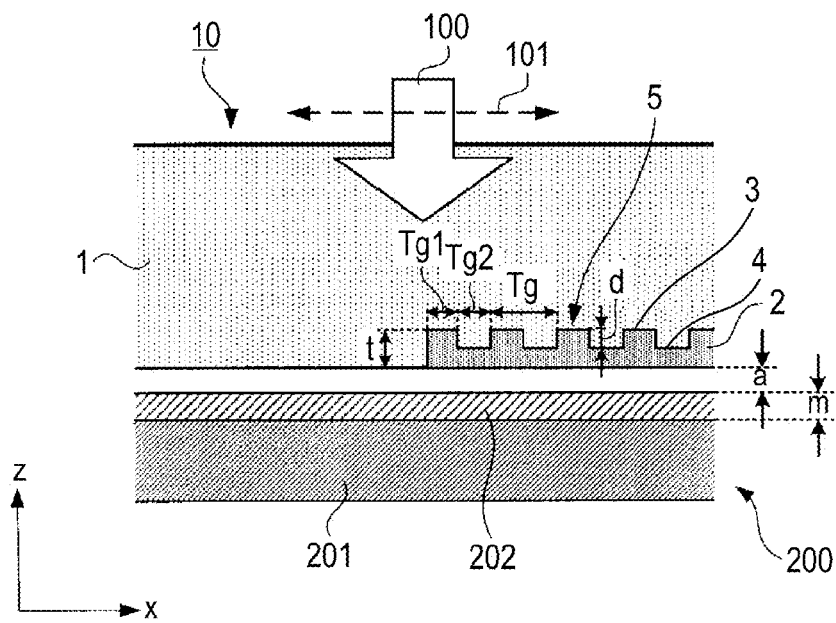

The intensity (electric field strength) distribution characteristic of the emitted light in the optical device 10 of the present embodiment is described below. The intensity distribution of the emitted light in the optical device 10 of the present embodiment was calculated using an electromagnetic field analysis simulator according to the FDTD (Finite Difference Time Domain) method. FIGS. 7A and 7B schematically represent the analysis model of the simulation analysis. FIG. 7A represents the relationship between the indentation pattern of the conductive film 2 of the optical device 10 and the polarization direction 101 of the incident light 100 in the analysis model. FIG. 7B is a cross sectional view at C-C of FIG. 7A.

In the simulation analysis, light from the optical device was shone on a recording medium 200 that included a recording layer-including information recording film 202 on a substrate 201, and the resulting electric field strength in the vicinity of the surface of the information recording film 202 was calculated. Specifically, the calculation of electric field strength was made at the position of the information recording film 202 1 nm down from the surface on the optical device 10 side upon irradiation of the recording medium 200 with the light from the optical device 10 (see Table 1 below).

In this analysis, as illustrated in FIG. 7A, linearly-polarized light is used as the incident light 100, and the polarization direction 101 coincides with the period direction (x direction in FIG. 7A) of the indentation pattern 5. The electric field strength distribution of the incident light 100 is ellipsoidal. Specifically, light satisfying the relation Lx>Ly is used, where Lx is the size of the region in which the electric field strength in the x direction in FIG. 7A is $1/e^2$ of the peak value, and Ly is the size of the region in which the electric field strength in y direction is $1/e^2$ of the peak value. Further, the simulation analysis considers the case where the incident light 100 is shone in such a manner that the center of its light spot coincides with the end portion 2t of the conductive film 2.

Figure 8A:
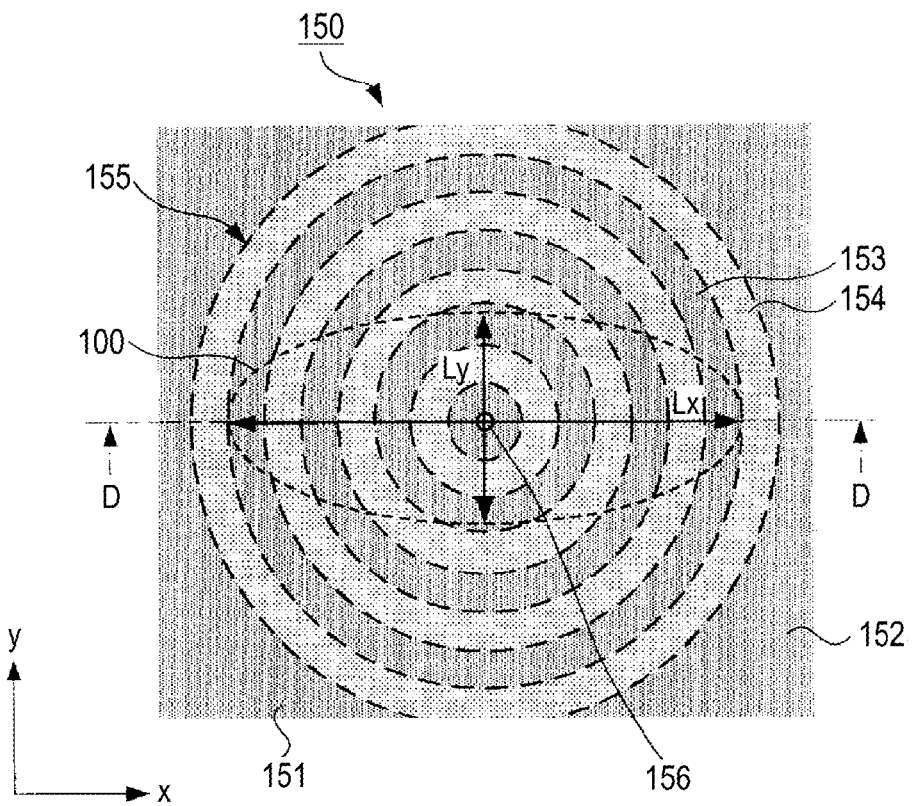
FIGS. 8A and 8B are views explaining the analysis model of a simulation analysis performed for an optical device of Comparative Example 1.
Figure 8B:
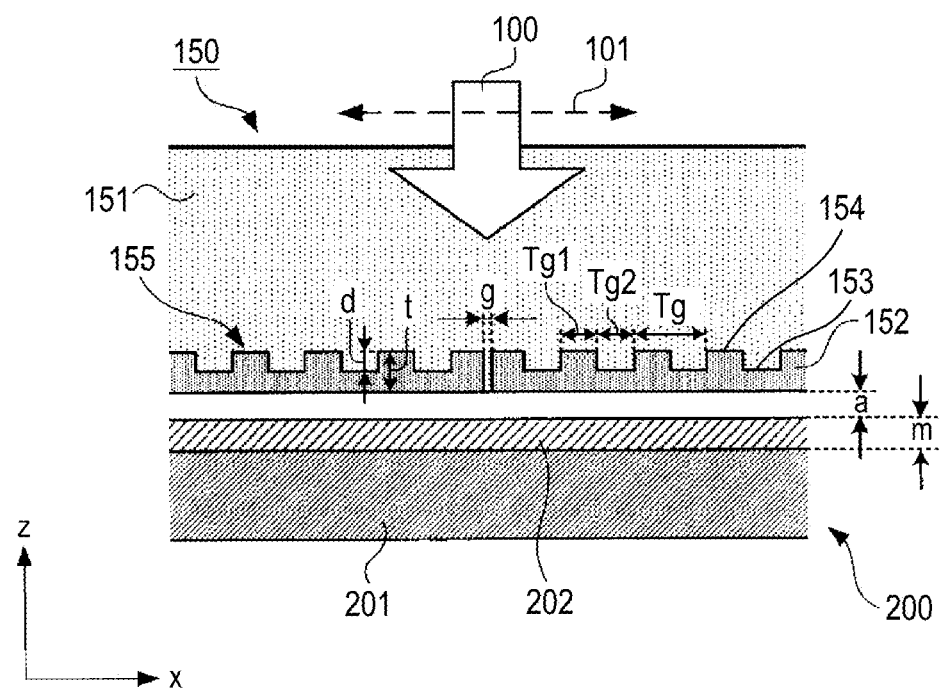

For comparison, a similar simulation analysis was performed for the optical device 150 of related art illustrated in FIGS. 1A to 1C (Comparative Example 1). FIGS. 8A and 8B represent the analysis model of the simulation analysis performed for the optical device 150 of Comparative Example 1. FIG. 8A represents the relationship between the indentation pattern 155 of the conductive film 152 of the optical device 150 and the polarization direction 101 of the incident light 100 in the analysis model. FIG. 8B is a cross sectional view at D-D of FIG. 8A.

Linearly-polarized light is used as the incident light 100 in the optical device 150 of Comparative Example 1 as in the simulation analysis of the present embodiment. Specifically, as illustrated in FIG. 8A, the polarization direction 101 of the incident light 100 is the x direction in FIG. 8A. Further, as in the simulation analysis of the present embodiment, Lx and Ly representing the $1/e^2$ total widths of the electric field strength distribution of the incident light 100 satisfy the condition Lx>Ly. The simulation analysis of Comparative Example 1 considers the case where the incident light 100 is shone in such a manner that the center of its light spot coincides with the center of the circular aperture 156 of the conductive film 152. In the simulation analysis of Comparative Example 1, the power of the incident light 100 is the same as that in the present embodiment.

Table 1 below represents specific calculation parameters (calculation conditions) used in the simulation analyses of the present embodiment and Comparative Example 1, including the material of each component of the optical device, dimension parameters, and a positional relationship between the optical device and the recording medium 200. Though not included in Table 1, the apex angle θ of the edge portion 2a of the conductive film 2 of the optical device 10 of the present embodiment is 90°.

TABLE 1

|  | Comparative Example 1 | First Embodiment | Second Embodiment |
|---|---|---|---|
| Base | SiO₂ | | |
| Conductive film | Au | | |
| Information recording film | Co | | |
| Recording medium substrate | SiO₂ | | |
| Wavelength of incident light | 780 nm | | |
| 1/e² Total widths of incident light spot size: Lx × Ly | 3,400 nm × 1,200 nm | | |
| Polarization direction | x axis direction | | |
| Power of incident light | same condition | | |
| Tg | 460 nm | | |
| Tg1 | 230 nm | | |
| Tg2 | 230 nm | | |
| t | 100 nm | | |
| d | 50 nm | | |
| Number of gratings | 4 | | |
| a | 7 nm | | |
| m | 10 nm | | |
| g | 50 nm to 200 nm | — | 12 nm |
| |E|² measurement point | Region of recording medium 1 nm down from the surface on the optical device side | | |

In Table 1, the number of gratings is the number of raised portions or recessed portions in the indentation pattern. The parameter a is the distance between the optical device and the recording medium 200, and the parameter m is the thickness of the information recording film 202 of the recording medium 200 (see FIG. 7B and FIG. 8B). The parameter g is the diameter of the circular aperture 156 of the optical device 150 of Comparative Example 1 (see FIG. 8B). For convenience, Table 1 also shows calculation conditions for Second Embodiment, which will be described later.

The analysis results concerning the intensity distribution of emitted light in the optical device 150 of Comparative Example 1 are explained first. FIGS. 9A and 9B, FIGS. 10A and 10B, and FIG. 11 represent the results of the simulation analysis performed for the optical device 150 of Comparative Example 1.

Figure 9A:
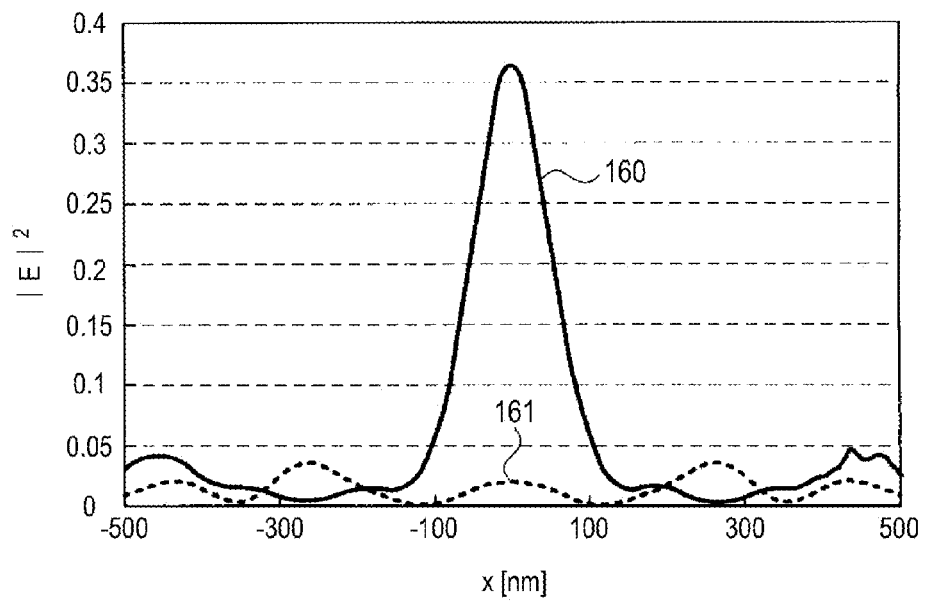
FIGS. 9A and 9B are views representing the result of the simulation analysis performed for the optical device of Comparative Example 1.
Figure 9B:
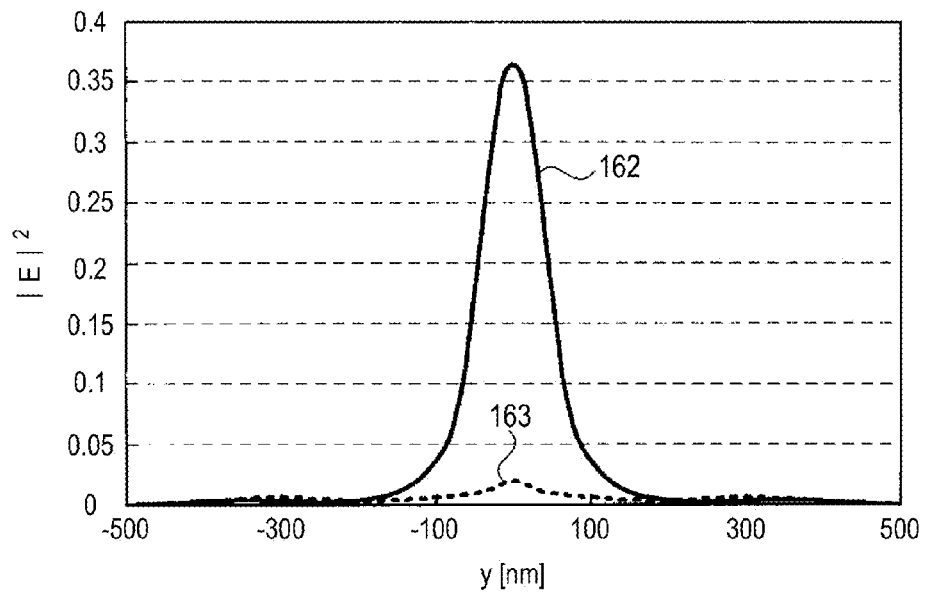

FIG. 9A represents the distribution characteristics of the electric field strength |E|² of emitted light along the x direction of FIG. 8A. The horizontal axis denotes positions along the x direction from the center of the circular aperture 156, and the vertical axis denotes electric field strength |E|². FIG. 9B represents the distribution characteristics of the electric field strength |E|² of emitted light along the y direction of FIG. 8A. The horizontal axis denotes positions along the y direction from the center of the circular aperture 156, and the vertical axis denotes electric field strength |E|². The characteristics 160 and 162 indicated by solid line in FIGS. 9A and 9B are intensity distribution characteristics when the diameter of the circular aperture 156 of the conductive film 152 is 100 nm. The characteristics 161 and 163 indicated by broken line are intensity distribution characteristics when the diameter of the circular aperture 156 is 50 nm.

When the diameter of the circular aperture 156 was 100 nm, the peak value of the electric field strength |E|² of emitted light was 0.365, as indicated by the characteristics 160 and 162 in FIGS. 9A and 9B. This value is the ratio of the electric field strength |E|² of emitted light with respect to the peak electric field strength of the incident light. The half width of the peak curve was 116 nm in the x direction, and 98 nm in the y direction. In contrast, when the diameter of the circular aperture 156 was 50 nm, no clear (large) peak was observed in the electric field strength, as clearly indicated by the characteristics 161 and 163 in FIGS. 9A and 9B.

Figure 10A:
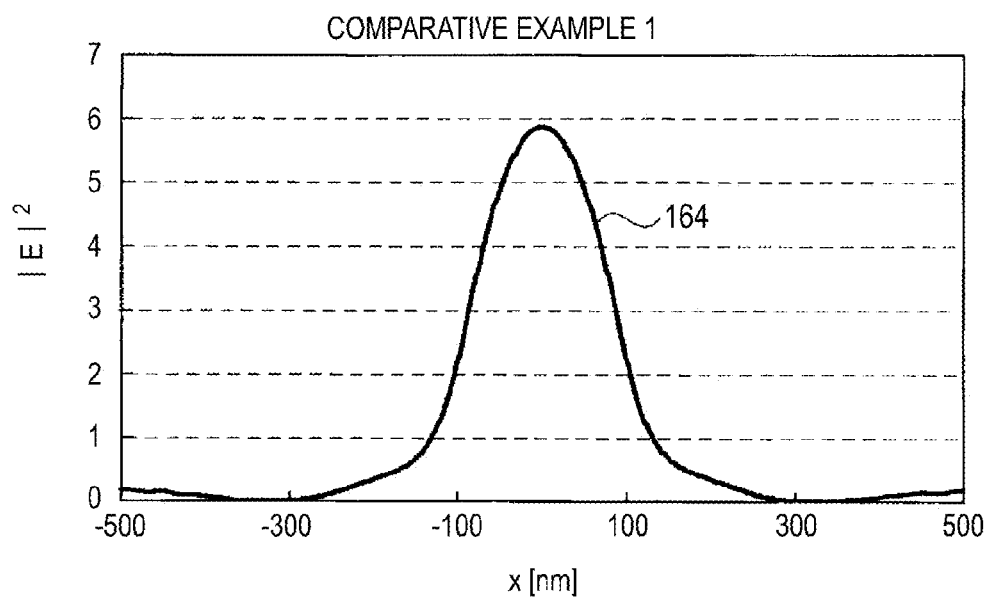
FIGS. 10A and 10B are views representing the result of the simulation analysis performed for the optical device of Comparative Example 1.
Figure 10B:
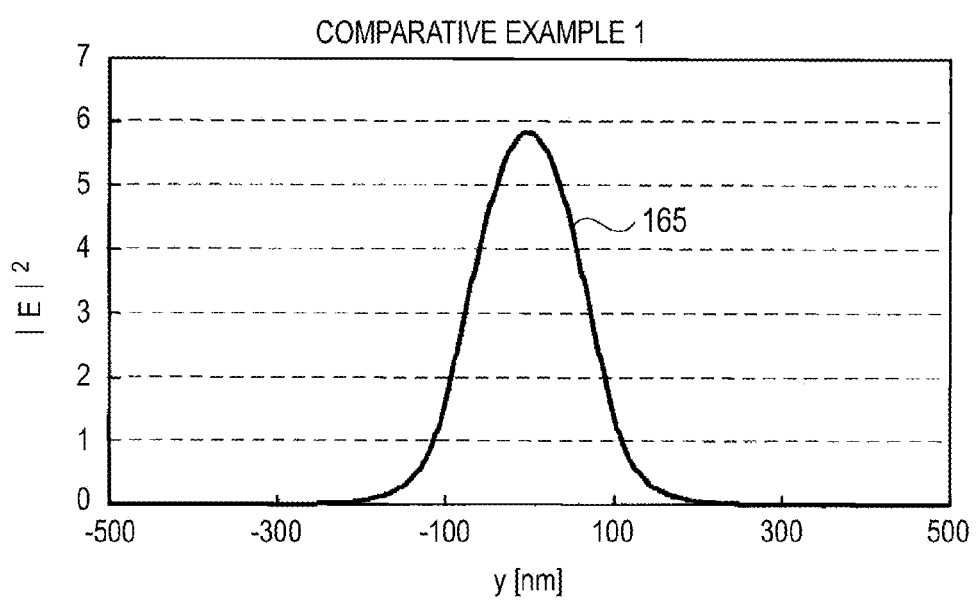

FIGS. 10A and 10B represent the distribution characteristics of electric field strength when the diameter of the circular aperture 156 of the conductive film 152 is 200 nm. FIG. 10A represents the distribution characteristics of the electric field strength |E|² of emitted light along the x direction of FIG. 8A. The horizontal axis denotes positions along the x direction from the center of the circular aperture 156, and the vertical axis denotes electric field strength |E|². FIG. 10B represents the distribution characteristics of the electric field strength |E|² of emitted light along the y direction of FIG. 8A. The horizontal axis denotes positions along the y direction from the center of the circular aperture 156, and the vertical axis denotes electric field strength |E|².

When the diameter of the circular aperture 156 was 200 nm, the peak value of the electric field strength |E|² of emitted light was 5.87 in terms of a ratio with respect to the peak electric field strength of the incident light, as indicated by the characteristics 164 and 165 in FIGS. 10A and 10B. The half width of the peak curve was 178 nm in the x direction, and 154 nm in the y direction.

Figure 11:
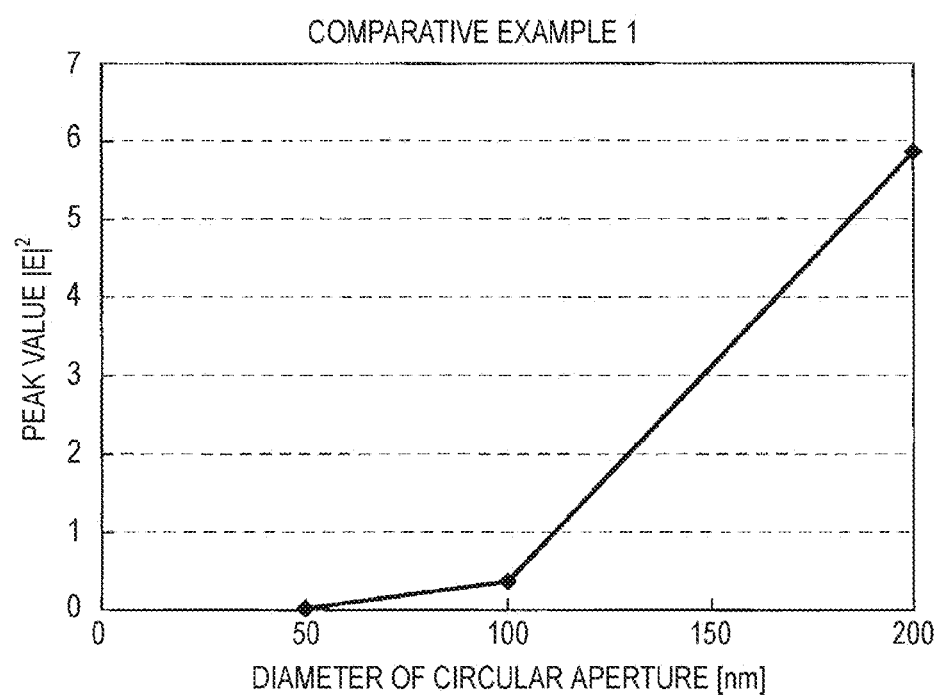
FIG. 11 is a view representing the result of the simulation analysis performed for the optical device of Comparative Example 1.

FIG. 11 represents the relationship between the peak value of the electric field strength |E|² of emitted light and the diameter of the circular aperture 156 of the conductive film 152 in the optical device 150 of Comparative Example 1. In FIG. 11, the horizontal axis denotes the diameter of the circular aperture 156 of the conductive film 152, and the vertical axis denotes the peak value of electric field strength |E|². As is clear from the characteristic shown in FIG. 11, the electric field strength decreases as the diameter of the circular aperture 156 of the conductive film 152 becomes smaller in the optical device 150 of Comparative Example 1.

As is clear from the characteristics shown in FIGS. 9A and 9B, FIGS. 10A and 10B, and FIG. 11, the output (electric field strength) decreases as the diameter of the circular aperture 156 of the conductive film 152 becomes smaller in the optical device 150 of Comparative Example 1. Particularly, when the diameter of the circular aperture 156 is set to 50 nm, about ¹⁄₁₀ of the real space wavelength λa=538 nm (calculated with the refractive index 1.45 of the base (SiO₂)) of the incident light 100, clear peaks do not occur in the electric field strength at the center of the circular aperture 156. This is because the emitted light is buried in the incident light 100 passing through the conductive film 152. In sum, in the optical device 150 of Comparative Example 1, the production of micro spot size light becomes difficult when the diameter of the circular aperture 156 is about ¹⁄₁₀ of the real space wavelength λa of the incident light 100.

Figure 12A:
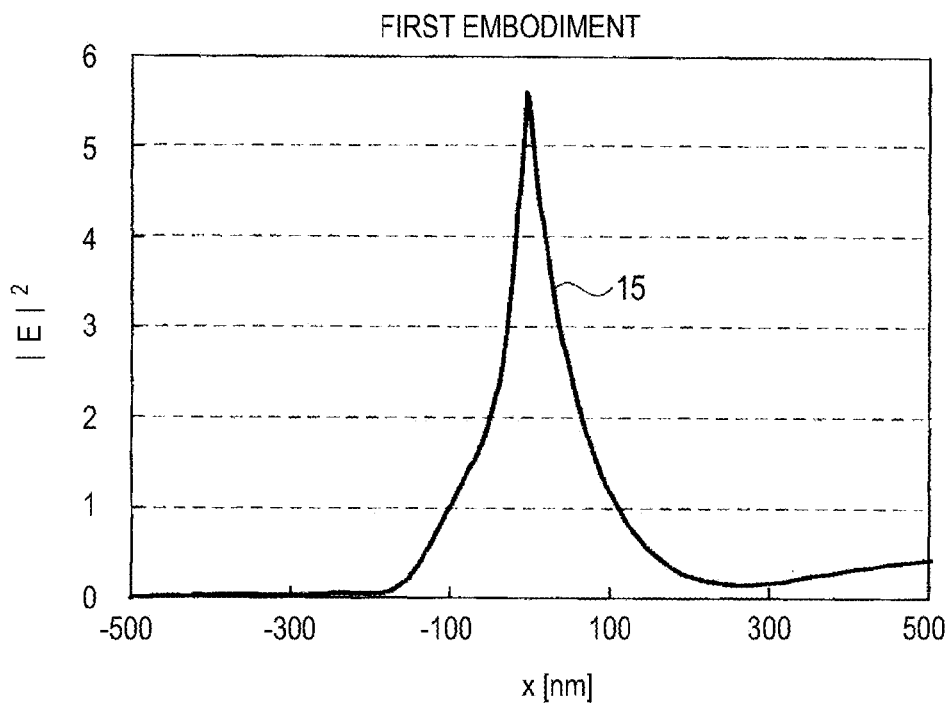
FIGS. 12A and 12B are views representing the result of the simulation analysis performed for the optical device of First Embodiment.
Figure 12B:
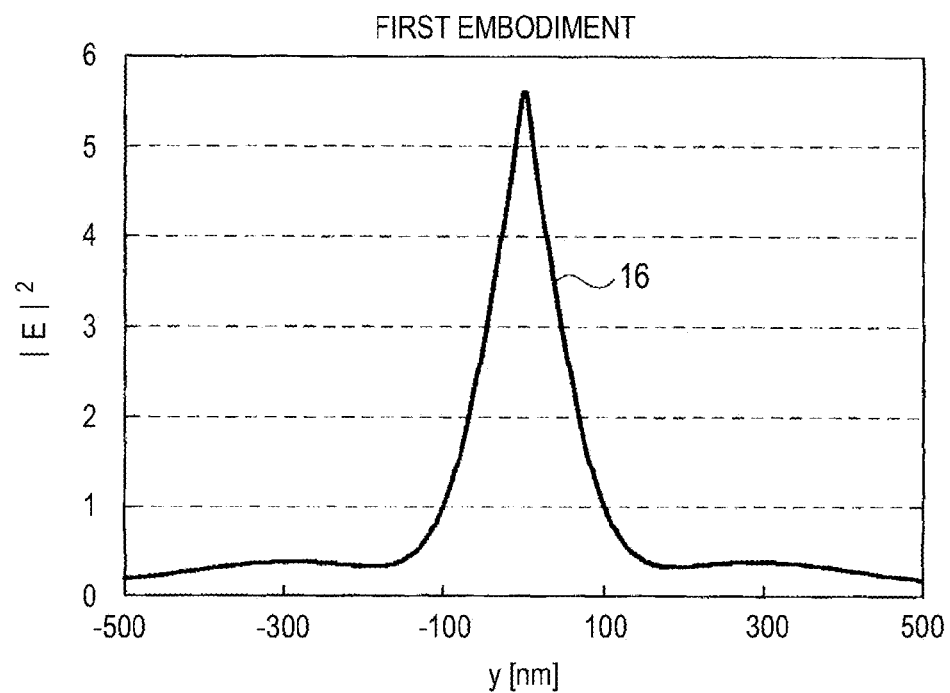

The analysis results concerning the intensity distribution of emitted light in the optical device 10 of the present embodiment are explained below. FIGS. 12A and 12B represent the results of the simulation analysis performed for the optical device 10 of the present embodiment.

FIG. 12A represents the distribution characteristics of the electric field strength |E|² of emitted light along the x direction of FIG. 7A. The horizontal axis denotes positions along the x direction from the end portion 2t of the conductive film 2, and the vertical axis denotes electric field strength $|E|^2$. FIG. 12B represents the distribution characteristics of the electric field strength $|E|^2$ of emitted light along the y direction of FIG. 7A. The horizontal axis denotes positions along the y direction from the end portion 2t of the conductive film 2, and the vertical axis denotes electric field strength $|E|^2$.

In the present embodiment, the peak value of the electric field strength $|E|^2$ of emitted light was 5.6 in terms of a ratio with respect to the peak electric field strength of the incident light, as indicated by characteristics 15 and 16 in FIGS. 12A and 12B. The half width of the peak curve was 74 nm in the x direction, and 102 nm in the y direction.

The analysis results concerning the optical device 10 of the present embodiment are compared with the analysis results obtained from the optical device 150 of Comparative Example 1. By comparing the half widths of the peak curves of the electric field strength characteristics, it can be seen that the present embodiment can produce light of substantially the same spot size as that obtained when the diameter of the circular aperture 156 of Comparative Example 1 is 100 nm.

However, as described above, when the diameter of the circular aperture 156 in the optical device 150 of Comparative Example 1 is 100 nm, the peak value of the electric field strength is 0.365 in terms of a ratio with respect to the peak electric field strength of the incident light. In contrast, in the optical device 10 of the present embodiment, the peak value of emitted light intensity is 5.6 in terms of a ratio with respect to the peak electric field strength of the incident light. In other words, the present embodiment, compared with Comparative Example 1, can increase the peak intensity by a factor of about 15 for the light spot of substantially the same size as that of Comparative Example 1.

This means that, in the present embodiment, the required power for the incident light 100 can be reduced to about 1/15 of that in Comparative Example 1. In other words, in the optical device 10 of the present embodiment, higher intensity light with a spot size smaller than the wavelength can be obtained, and the power of the incident light 100 can be used more efficiently. Apparently, this is made possible by the non-circular shape, as viewed from the incident side of the incident light 100, of the edge portion 2a producing the emitted light, greatly reducing the propagation loss of the surface plasmons at the edge portion 2a of the conductive film 2 in the optical device 10 of the present embodiment.

[Variation 1]

First Embodiment described the exemplary configuration in which the indentation pattern 5 formed on the surface of the conductive film 2 on the base 1 side included the arc-shaped raised portions 3 and recessed portions 4 of a constant width. However, the present invention is not limited to this. The indentation pattern 5 may have any periodic pattern as long as it can produce the surface plasmon enhancement effect on the conductive film 2. The following describes an example of such a Variation of the indentation pattern 5 (Variation 1).

Figure 13A:
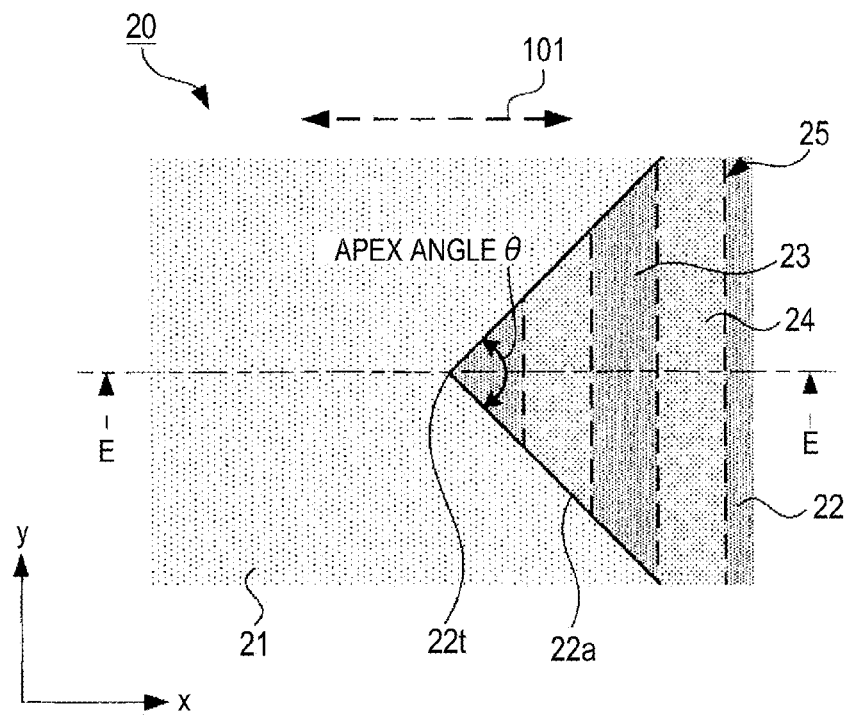
FIG. 13A is a schematic bottom view of an optical device of Variation 1.
Figure 13B:
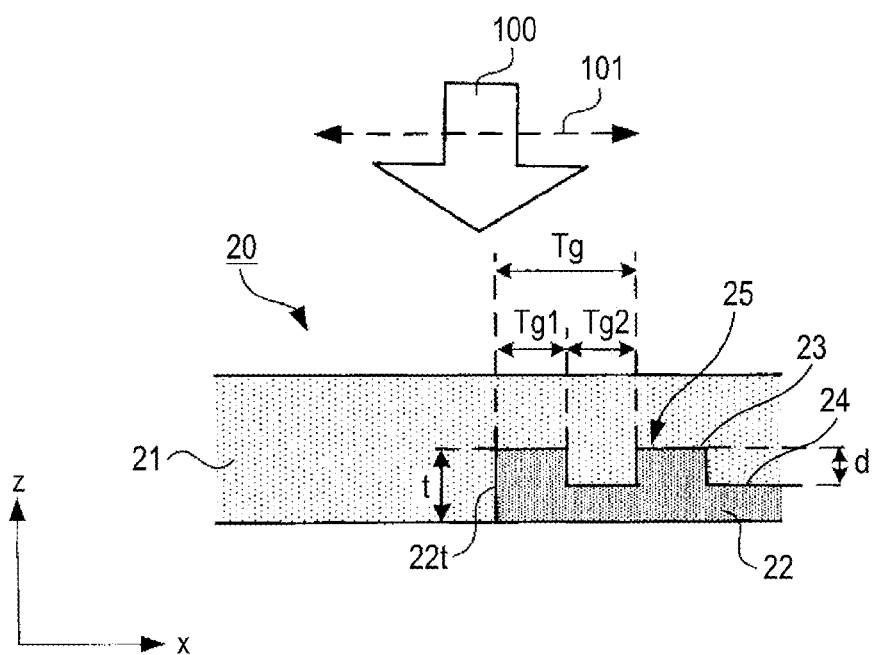
FIG. 13B is a cross sectional view taken at E-E of FIG. 13A.

FIGS. 13A and 13B illustrate a schematic configuration of an optical device of Variation 1. FIG. 13A is a schematic bottom view of the optical device, and FIG. 13B is a cross sectional view at E-E of FIG. 13A. For ease of explanation, FIGS. 13A and 13B illustrate only a portion of the conductive film in the vicinity of an end portion.

An optical device 20 of this example is configured to include mainly a base 21, and a conductive film 22 formed in a portion of the base 21 on one of the base surfaces. In this example, the direction of polarization (broken line arrow 101 in FIGS. 13A and 13B) of the incident light 100 is along the period direction (x direction in FIGS. 13A and 13B) of an indentation pattern 25 formed on a surface of the conductive film 22.

As with the base 1 of First Embodiment, the base 21 is a plate-like light transmissive member, and can be formed using the materials used in First Embodiment.

The conductive film 22 is a metallic film formed of the same kind of material used for the conductive film 2 of First Embodiment. The edge portion 22a of the conductive film 22 is in the shape of the letter L (triangular) with apex angle θ, as in the conductive film 2 of First Embodiment.

The surface of the conductive film 22 on the base 21 side has an indentation pattern 25 of a period Tg including straight-stripe raised portions 23 of a constant width, and straight-stripe recessed portions 24 of a constant width. In this example, the direction of extension of the raised portions 23 and the recessed portions 24 is a direction (y direction in FIGS. 13A and 13B) orthogonal to the polarization direction 101 of the incident light 100. The origin of the indentation pattern 25 is the end portion 22t of the conductive film 22. As in First Embodiment, the period Tg of the indentation pattern 25, the width Tg1 and height t of the raised portions 23, and the width Tg2 and depth d of the recessed portions 24 are appropriately set as to as obtain the surface plasmon enhancement effect.

In this manner, the indentation pattern 25 is appropriately set to have a structure capable of obtaining the surface plasmon enhancement effect, as in the foregoing example. Thus, the optical device 20 of this example also can produce high-intensity emitted light of a micro spot size in the vicinity of the end portion 22t of the conductive film 22, and can utilize the power of the incident light 100 with improved efficiency, as with the optical device 10 of First Embodiment. From the standpoint of phase matching of the surface plasmons at the end portion of the conductive film, it is preferably to form the indentation pattern in a concentric configuration as in First Embodiment.

[Variation 2]

In the optical devices of First Embodiment and Variation 1, the cross sectional shape of the indentation pattern of the conductive film has a form of a rectangular wave, and the surfaces of the raised portions and the recessed portions are flat. However, the present invention is not limited to this. Any configuration is possible as long as the surface profile (cross sectional shape of the conductive film) of the indentation pattern is such that the surface plasmon enhancement effect is produced on the conductive film. The surface profile of the indentation pattern of the conductive film can be appropriately selected according to, for example, intended use. In Variation 2, various exemplary configurations of the surface profile of the indentation pattern formed on the conductive film (cross sectional shape of the conductive film) are described.

FIGS. 14 to 17 illustrate various exemplary configurations of the surface profile of the indentation pattern formed on the conductive film (cross sectional shape of the conductive film; Variations 2-1 to 2-4). FIGS. 14 to 17 are schematic cross sectional views along the period direction (x direction in FIGS. 14 to 17) of the indentation pattern of the conductive film of each Variation.

Figure 14:
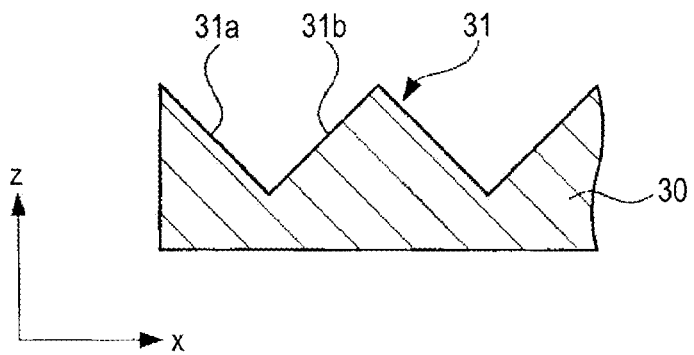
FIG. 14 is a schematic cross sectional view of a conductive film of an optical device of Variation 2-1.

A conductive film 30 illustrated in FIG. 14 (Variation 2-1) has a triangular-wave (serrated) cross sectional shape, and includes an indentation pattern 31 that has slope portions 31a and 31b. In the conductive film 30 illustrated in FIG. 14, the slope portions 31a and 31b are alternately disposed in the period direction (x direction in FIG. 14), and the adjacent slope portions 31a and 31b define the trough or the peak of the indentation pattern 31.

Figure 15:
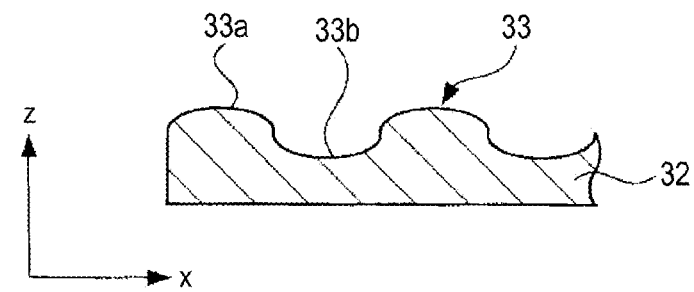
FIG. 15 is a schematic cross sectional view of a conductive film of an optical device of Variation 2-2.

A conductive film 32 illustrated in FIG. 15 (Variation 2-2) has a sinusoidal-wave cross sectional shape, and includes an indentation pattern 32 that has arc-shaped raised portions 33a and arc-shaped recessed portions 33b. In the conductive film 32 illustrated in FIG. 15, the arc-shaped raised portions 33a and the arc-shaped recessed portions 33b are alternately disposed in the period direction (x direction in FIG. 15).

Figure 16:
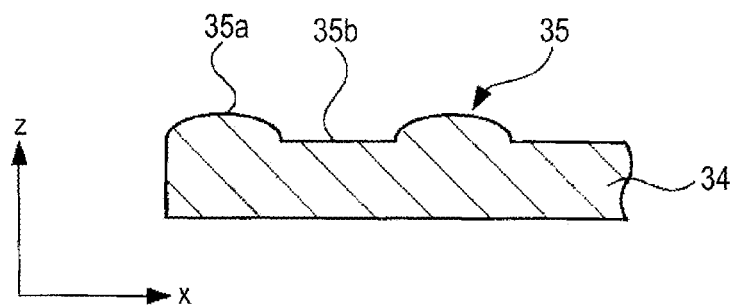
FIG. 16 is a schematic cross sectional view of a conductive film of an optical device of Variation 2-3.

A conductive film 34 illustrated in FIG. 16 (Variation 2-3) has an indentation pattern 35 that includes arc-shaped, protruding raised portions 35a, and a flat surface 35b formed between the raised portions 35a. As used herein, the cross sectional shape of the conductive film 34 illustrated in FIG. 16 is referred to as an arc-shaped protrusion.

Figure 17:
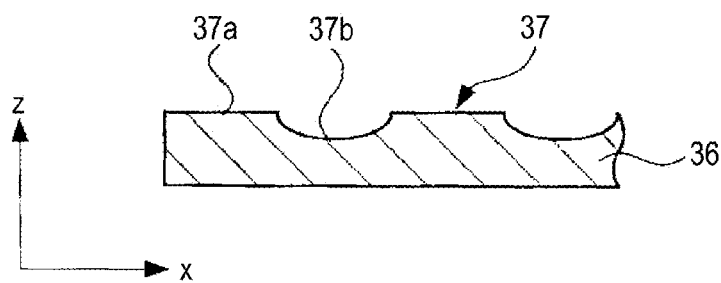
FIG. 17 is a schematic cross sectional view of a conductive film of an optical device of Variation 2-4.

A conductive film 36 illustrated in FIG. 17 (Variation 2-4) has an indentation pattern 37 that includes arc-shaped, grooved recessed portions 37b, and a flat surface 37a formed between the recessed portions 37b. As used herein, the cross sectional shape of the conductive film 36 illustrated in FIG. 17 is referred to as an arc-shaped groove.

The advantages of First Embodiment can also be obtained with the various indentation patterns of the conductive films of FIGS. 14 to 17, by appropriately setting the dimensions of the indentation patterns so as to obtain the surface plasmon enhancement effect. From the standpoint of ease of formation of the indentation pattern, it is preferable to form the indentation pattern of the conductive film with a rectangular-wave cross sectional shape, and with the flat-surface raised and recessed portions, as in First Embodiment.

In addition to the cross sectional shapes of the indentation patterns of the conductive films described in Variations 2-1 to 2-4, the indentation pattern may have, for example, a trapezoidal cross sectional shape. Further, the indentation pattern of the conductive film may be configured by appropriately combining the shapes described in First Embodiment and Variations 2-1 to 2-4. Specifically, the indentation pattern of the conductive film may be configured by appropriately combining two or more of the cross sectional shapes of a rectangular-wave, a triangular-wave, a sinusoidal-wave, an arc-shaped protrusion, and an arc-shaped groove described in First Embodiment and Variations 2-1 to 2-4.

[Variation 3]

First Embodiment described the exemplary configuration in which the edge portion 2a of the conductive film 2 has the shape of the letter L (triangular) with apex angle θ as viewed from the incident side of the incident light 100. However, the present invention is not limited to this. The edge portion of the conductive film as viewed from the incident side of the incident light may be configured to have any shape according to, for example, a required spot size, and intended use. In Variation 3, various exemplary configurations of the edge portion of the conductive film are described.

FIGS. 18 to 22 illustrate various exemplary configurations of the shape of the edge portion of the conductive film as viewed from the incident side of the incident light (Variations 3-1 to 3-5). For ease of explanation, the indentation pattern of the conductive film is not shown in FIGS. 18 to 22. Further, in FIGS. 18 to 22, elements analogous to those described in First Embodiment (FIG. 2A) are shown with the same reference numerals.

Figure 18:
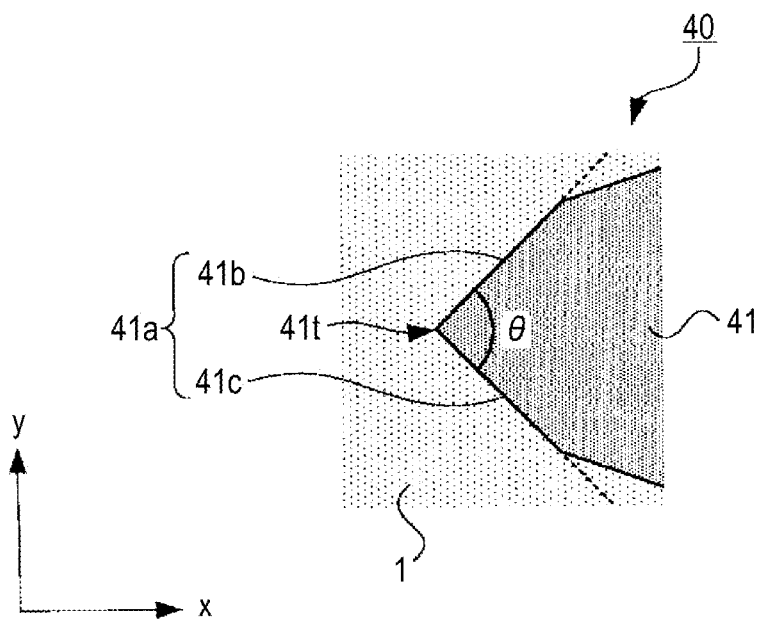
FIG. 18 is a view schematically illustrating a configuration of an edge portion of a conductive film of an optical device of Variation 3-1.

An optical device 40 illustrated in FIG. 18 (Variation 3-1) has a conductive film 41 with a protruding edge portion 41a of apex angle θ. In this example, the two side portions 41b and 41c that define the edge portion 41a, and that extend from an end portion 41t of the edge portion 41a are substantially in the shape of the letter L, and are bent in the narrowing direction of the conductive film 41 along the way. Further, the L-shaped side portions 41b and 41c defining the edge portion 41a are symmetrical about the direction (x direction in FIG. 18) orthogonal to the tangential direction (y direction in FIG. 18) of the end portion 41t of the conductive film 41.

Figure 19:
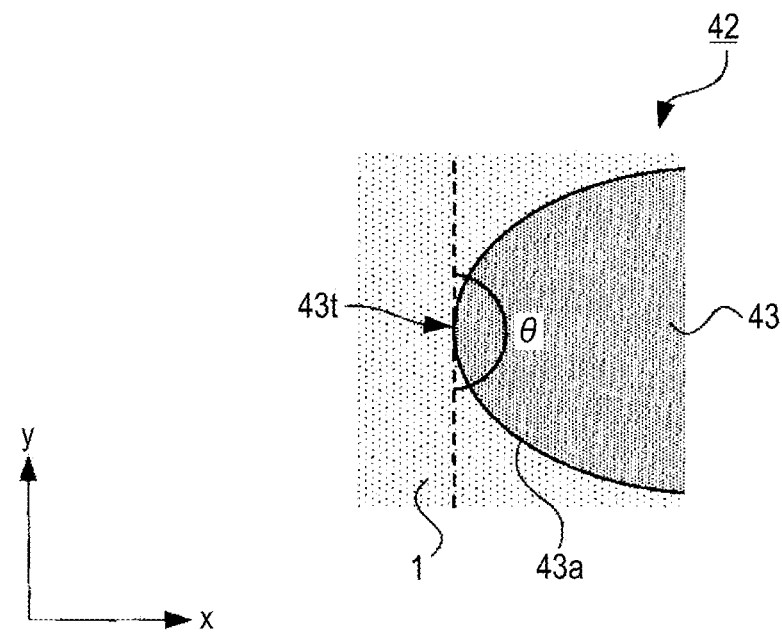
FIG. 19 is a view schematically illustrating a configuration of an edge portion of a conductive film of an optical device of Variation 3-2.

An optical device 42 illustrated in FIG. 19 (Variation 3-2) has a conductive film 43 with a semi-ellipsoidal edge portion 43a. The edge portion 43a is symmetrical about the direction (x direction in FIG. 19) orthogonal to the tangential direction (y direction in FIG. 19) of the end portion 43t of the conductive film 43. In this case, the apex angle θ of the edge portion 43a is 180°, the tangential direction of the end portion 43t of the edge portion 43a.

Figure 20:
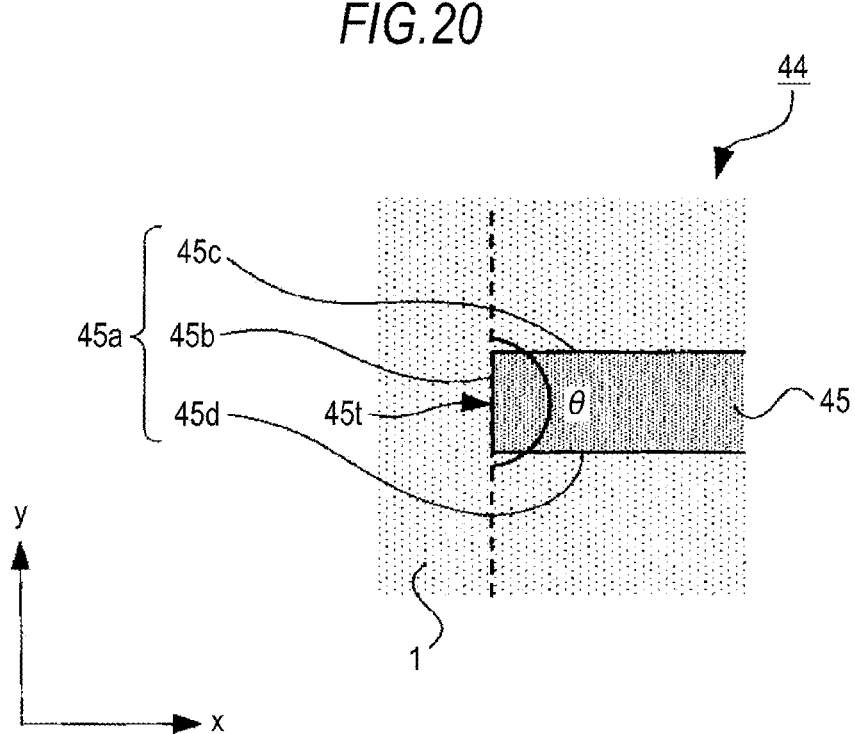
FIG. 20 is a view schematically illustrating a configuration of an edge portion of a conductive film of an optical device of Variation 3-3.

An optical device 44 illustrated in FIG. 20 (Variation 3-3) has a conductive film 45 with a rectangular edge portion 45a of a constant width. The edge portion 45a is formed by a side portion 45b that includes an end portion 45t, and two side portions 45c and 45d that linearly extend out from the ends of the side portion 45b along the direction of extension of the edge portion 45a (x direction in FIG. 20). Further, in the optical device 44 of this example, the side portion 45b including the end portion 45t of the edge portion 45a is a straight line, and the direction of extension of the side portion 45b is orthogonal to the direction of extension (x direction in FIG. 20) of the edge portion 45a. Thus, in the conductive film 45 of FIG. 20, the apex angle θ of the edge portion 45a is 180°.

Figure 21:
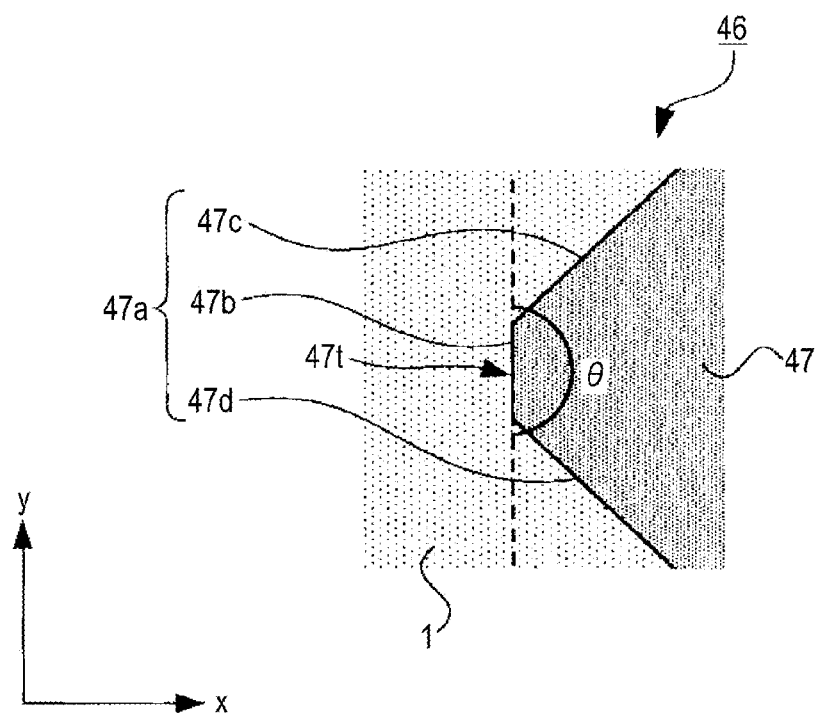
FIG. 21 is a view schematically illustrating a configuration of an edge portion of a conductive film of an optical device of Variation 3-4.

An optical device 46 illustrated in FIG. 21 (Variation 3-4) has a conductive film 47 with an edge portion 47a of such a configuration that a side portion 47b including an end portion 47t is a straight line as opposed to the edge portion 2a of the conductive film 2 of First Embodiment. Specifically, in the example illustrated in FIG. 21, the edge portion 47a is trapezoidal in shape, and includes the side portion 47b that includes the end portion 47t, and side portions 47c and 47d that linearly extend out from the ends of the side portion 47b with a predetermined angle in the widening direction of the conductive film 47. The edge portion 47a is symmetrical about the direction (x direction in FIG. 21) orthogonal to the tangential direction of the end portion 47t. In the conductive film 46 of FIG. 21, the apex angle θ of the edge portion 47a is 180°.

Figure 22:
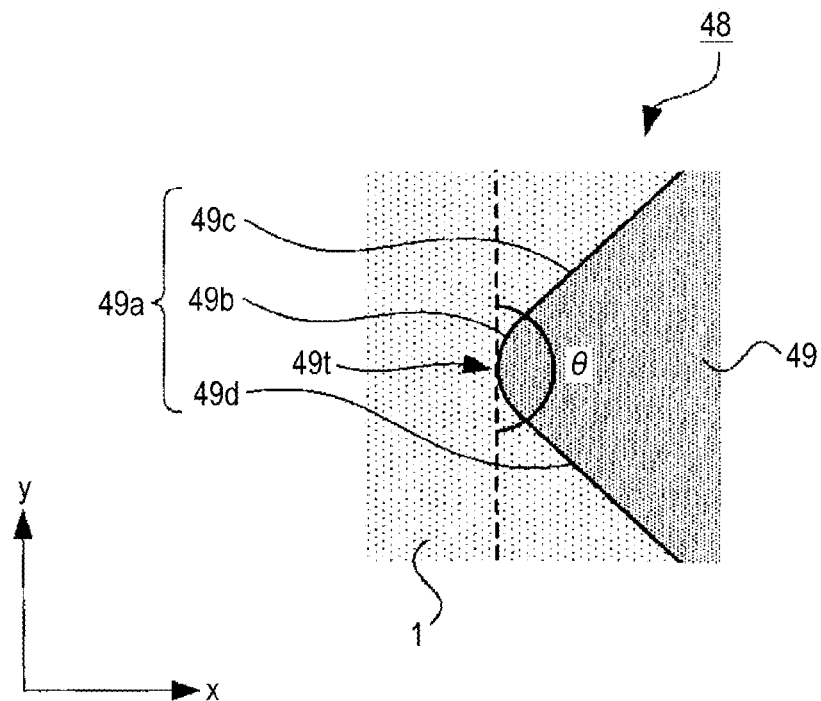
FIG. 22 is a view schematically illustrating a configuration of an edge portion of a conductive film of an optical device of Variation 3-5.

An optical device 48 illustrated in FIG. 22 (Variation 3-5) has a conductive film 49 with an edge portion 49a of such a configuration that an end portion 49t is arc-shaped as opposed to the end portion 2t of the edge portion 2a of the conductive film 2 of First Embodiment. Specifically, in the optical device 48 of FIG. 22, the edge portion 49a includes an arc-shaped side portion 49b that includes the end portion 49t, and two side portions 49c and 49d that linearly extend from the ends of the side portion 49b with a predetermined angle in the widening direction of the conductive film 49. The edge portion 49a is symmetrical about the direction (x direction in FIG. 22) orthogonal to the tangential direction of the end portion 49t. In the conductive film 48 of FIG. 22, the apex angle θ of the edge portion 49a is 180°.

In the examples illustrated in FIGS. 18 to 22, the indentation pattern formed on the surface of the conductive film may be a concentrically formed periodic pattern, as in First Embodiment (FIG. 2A). Further, as in Variation 1 (FIG. 13A), the indentation pattern may be periodic only in one direction.

Figure 23:
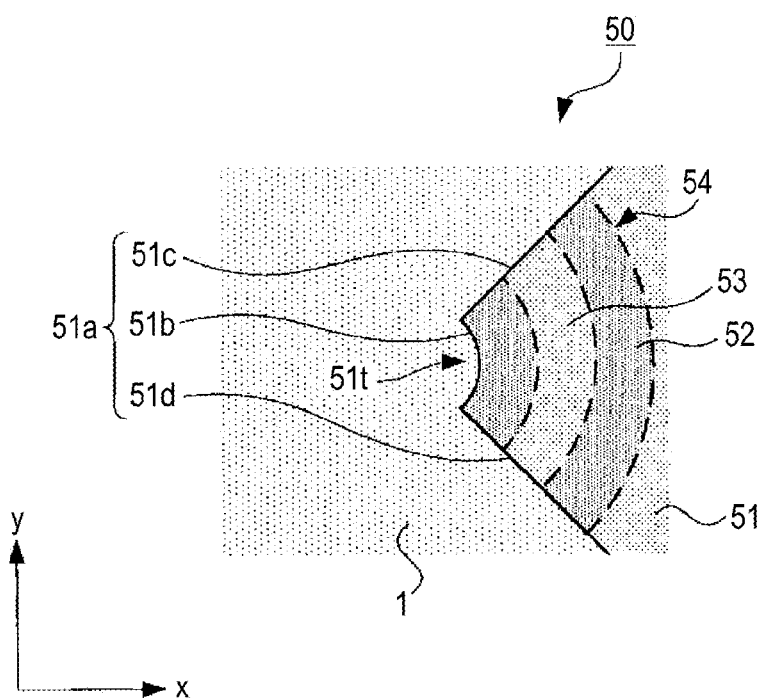
FIG. 23 is a view schematically illustrating a configuration of an edge portion of a conductive film of an optical device of Variation 3-6.

In the examples illustrated in FIGS. 18 to 22, the side portion(s) including the end portion of the edge portion of the conductive film is in the form of a protrusion or flat as viewed from the incident side of the incident light. However, the present invention is not limited to this, and the side portion(s) including the end portion of the edge portion may have a form of a depression. FIG. 23 illustrates an example of such a configuration (Variation 3-6). In FIG. 23, elements analogous to those described in First Embodiment (FIG. 2A) are shown with the same reference numerals.

In the conductive film 2 of First Embodiment, the innermost portion of the edge portion 2a including the end portion 2t is a raised portion 3 with a fan-shaped surface. In an optical device 50 illustrated in FIG. 23, the innermost portion of an edge portion 51a including an end portion 51t is an arc-shaped raised portion 52 of a constant width. Specifically, in the optical device 50 of FIG. 23, the edge portion 51a includes an arc-shaped depressed side portion 51b that includes the end portion 51t, and two side portions 51c and 51d that linearly extend out from the ends of the side portion 51b with a predetermined angle in the widening direction of a conductive film 51. In this case, the origin (reference) of the periodic structure of an indentation pattern including arc-shaped raised portions 52 and recessed portions 53 is the arc-shaped depressed side portion 51b that includes the end portion 51t. The other configuration is the same as that of First Embodiment.

Figure 24:
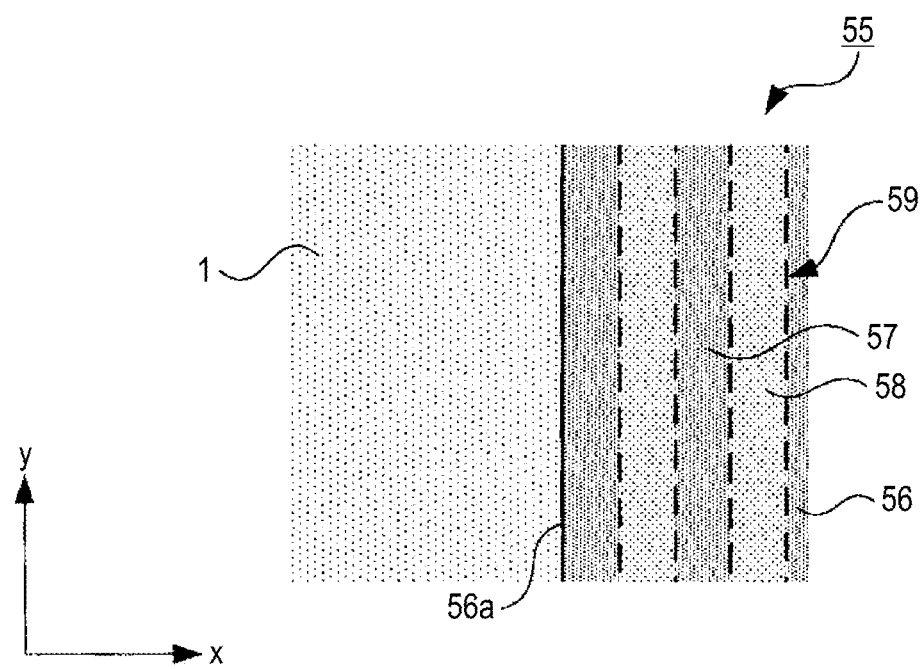
FIG. 24 is a view schematically illustrating a configuration of an edge portion of a conductive film of an optical device of Variation 3-7.

In the examples illustrated in FIGS. 18 to 23, the edge portion of the conductive film has a form of a protrusion overall as viewed from the incident side of the incident light. However, the present invention is not limited to this. The side portion defining the edge portion of the conductive film may be linear throughout the edge portion. FIG. 24 illustrates an example of such a configuration (Variation 3-7). In FIG. 24, elements analogous to those described in First Embodiment (FIG. 2A) are shown with the same reference numerals.

In an optical device 55 illustrated in FIG. 24, the side portion defining an edge portion 56a of a conductive film 56 linearly extends in a predetermined direction. When the overall shape of the edge portion 56a is linear as in this example, it is preferable that an indentation pattern 59 that includes alternately disposed raised portions 57 and recessed portions 58 formed in straight stripes parallel to the side portion defining the edge portion 56a be formed on the surface of the conductive film 56 on the base 1 side. In this case, the edge portion 56a (edge) of the conductive film 56 becomes the emitting portion of light (end portion) as a whole.

In the optical device 55 of FIG. 24, the indentation pattern may be configured to include alternately disposed, arc-shaped raised portions and recessed portions of a concentric pattern, as in First Embodiment. In this case, light of the highest intensity is produced in the vicinity of the origin (end portion) of the indentation pattern.

It should be noted, however, that the size of the light spot of emitted light can be further reduced by narrowing the shape of the edge portion of the conductive film. Thus, from the standpoint of reducing the spot size, it is preferable that the edge portion of the conductive film have a form of a protrusion overall as in First Embodiment and in the examples illustrated in FIGS. 18 to 23. Further, the intensity of the light spot can be increased as the area of the light-receiving face of the conductive film is increased, because the increased light-receiving area improves the light collecting effect. Thus, from the standpoint of reducing the spot size and increasing the light intensity, the edge portion of the conductive film preferably has the shape described in First Embodiment.

2. Second Embodiment

Configuration of Optical Device

Figure 25A:
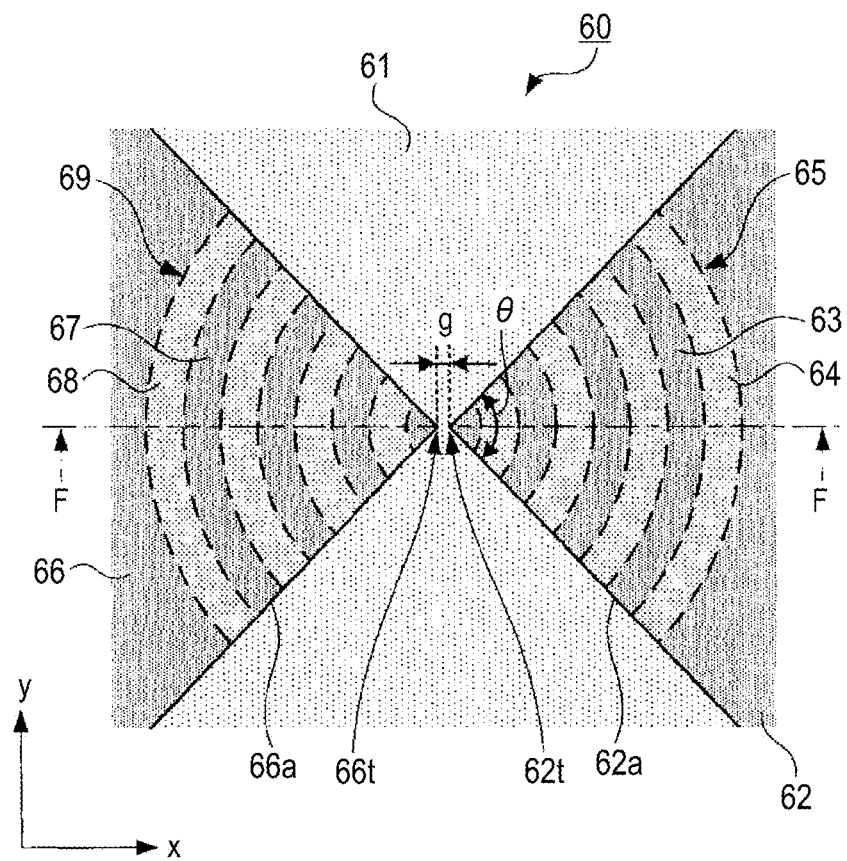
FIG. 25A is a schematic bottom view of an optical device according to Second Embodiment.
Figure 25B:
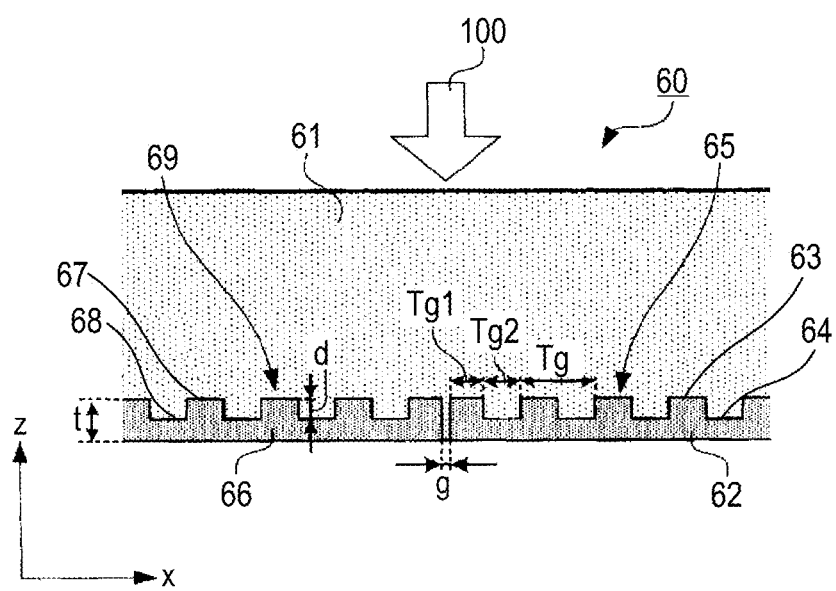
FIG. 25B is a cross sectional view taken at F-F of FIG. 25A.

FIGS. 25A and 25B illustrate a schematic configuration of an optical device according to Second Embodiment of the present invention. FIG. 25A is a schematic bottom view of the optical device of the present embodiment, and FIG. 25B is a cross sectional view at F-F of FIG. 25A. For ease of explanation, FIGS. 25A and 25B illustrate only a region of the conductive film (described later) where an indentation pattern is formed.

An optical device 60 is configured to include mainly a base 61, and a first conductive film 62 and a second conductive film 66 formed in portions of the base 61 on one of the base surfaces. In the present embodiment, as illustrated in FIG. 25B, the surfaces of the first conductive film 62 and the second conductive film 66 opposite from the base 61 are flat surfaces, which are in flush with the surface of the base 61. Further, in the optical device 60 of the present embodiment, the incident light 100 from a light source (not illustrated) is shone on the first conductive film 62 and the second conductive film 66 via the base 61.

The base 61 is a plate-like light transmissive member, and can be formed using the materials used for the base 1 of First Embodiment.

The first conductive film 62 is a metallic film in which an edge portion 62a has a form of a protrusion as viewed from the incident side of the incident light 100, as in the conductive film 2 described in First Embodiment. Specifically, the edge portion 62a of the first conductive film 62 is in the shape of the letter L (triangular) with apex angle θ as viewed from the incident side of the incident light 100, and is defined by two side portions that linearly extend from an end portion 62t of the edge portion 62a.

As in First Embodiment, a first indentation pattern 65 of a predetermined period Tg is formed on the surface of the first conductive film 62 on the base 61 side. The first indentation pattern 65 includes arc-shaped raised portions 63 (the innermost raised portion 63 is fan-shaped) of a constant width, and arc-shaped recessed portions 64 of a constant width. The raised portions 63 and the recessed portions 64 are alternately disposed, concentric to the end portion 62t of the edge portion 62a. In the present embodiment, the innermost portion including the end portion 62t of the first conductive film 62 is a raised portion 63. However, the present invention is not limited to this, and the innermost portion including the end portion 62t of the first conductive film 62 may be a recessed portion 64.

The second conductive film 66 has the same configuration as the first conductive film 62. Specifically, the shape of an edge portion 66a, and the configuration of a second indentation pattern 69 (raised portions 67 and recessed portions 68) of the second conductive film 66 are the same as the shape of the edge portion 62a and the configuration of the first indentation pattern 65 of the first conductive film 62. The second conductive film 66 is disposed symmetrical to the first conductive film 62 about the tangential direction (y direction in FIG. 25A) of the end portion 62t of the first conductive film 62. Here, the end portion 62t of the first conductive film 62 and the end portion 66t of the second conductive film 66 are disposed face to face with a predetermined gap g (gap) in between. The predetermined gap g is smaller than the real space wavelength λa (space wavelength in the base 21) of the incident light 100.

The size of the gap (g) between the first conductive film 62 and the second conductive film 66 is appropriately set according to such factors as intended use, for example. Preferably, the gap is set to be equal to or less than the spot size required for the irradiation target. This is because the emitted light from the optical device of the embodiment of the present invention increases its spot size as it travels away from the conductive film.

In the present embodiment, the origin of the periodic structure of the first indentation pattern 65 of the first conductive film 62 is the end portion 62t of the first conductive film 62, and the origin of the periodic structure of the second indentation pattern 69 of the second conductive film 66 is the end portion 66t of the second conductive film 66. However, the present invention is not limited to this, and the origins of the periodic structures of the first indentation pattern 65 and the second indentation pattern 69 may be at the center of the gap, because the gap between the first conductive film 62 and the second conductive film 66 is usually very small.

In the present embodiment, the indentation patterns are configured so that the surface plasmons produced on the boundary wall surfaces of the raised portions and the recessed portions propagate in phase, and that the surface plasmons propagating in this manner overlap in phase with the surface plasmons produced on the metallic wall surfaces that define the end portions of the conductive films. Specifically, in the present embodiment, the period Tg of each indentation pattern, the width Tg1 and height t of the raised portions, and the width Tg2 and depth d of the recessed portions are appropriately set so as to obtain the surface plasmon enhancement effect on the conductive films (see FIG. 25B). For example, the period Tg of each indentation pattern is set so that the light intensity measured in the vicinity of the gap between the conductive films becomes greater than that produced without the periodic structure. The width Tg1 of the raised portions, and the width Tg2 of the recessed portions in each indentation pattern may be the same or different.

In the present embodiment, the lengths of the first conductive film 62 and the second conductive film 66 along the period direction (x direction in FIGS. 25A and 25B) are longer than the maximum radius of the spot of the incident light 100. Further, in order to fully utilize the surface plasmon enhancement effect, it is preferable that the first indentation pattern 65 and the second indentation pattern 69 be formed over a region equal to or greater than the spot size of the incident light 100 with respect to the origin.

The first conductive film 62 and the second conductive film 66 configured as above can be formed on the base 61 in the manner described in First Embodiment. Further, the first conductive film 62 and the second conductive film 66 can be formed using the same materials used for the conductive film 2 described in First Embodiment.

Further, in the present embodiment, as in First Embodiment, an interlayer may be laminated between the base 61 and the first and second conductive films 62 and 66, in order to improve adhesion and reliability. In this case, it is preferable that the interface layer be sufficiently thinner than the first conductive film 62 and the second conductive film 66. The interface layer can be formed using materials, for example, such as Ti and Cr.

When using the optical device 60 of the present embodiment for, for example, a recording and reproducing apparatus, a light transmissive film may be formed on surfaces of the first conductive film 62 and the second conductive film 66 to prevent damage caused by the contact with a recording medium during operation, as in First Embodiment. In this case, it is preferable to use materials with high mechanical strength, for example, such as diamond-like carbon (DLC), as the material of the light transmissive film. The materials used to form the base 61 may also be used for the light transmissive film. In this case, the materials used for the base 61 and the light transmissive film may be the same or different.

In the present embodiment, when the incident light 100 is incident light that has anisotropy in the direction of polarization, the incident light 100 is incident in such a manner that its principal direction of polarization coincides with the opposing direction of the first conductive film 62 and the second conductive film 66 (x direction in FIGS. 25A and 25B). Note that, in the present embodiment, circularly polarized or randomly polarized incident light may be used as the incident light 100. In this case, the period direction of the indentation pattern of each conductive film may be set in any direction.

In the present embodiment, it is preferable to adjust the irradiation position of the incident light so that the intensity peak portion (spot center) of the incident light 100 coincides with the center (middle point) of the gap between the first conductive film 62 and the second conductive film 66.

In the optical device 60 of the present embodiment, the period of each indentation pattern is set so that the surface plasmon enhancement effect is produced on the respective surfaces of the first conductive film 62 and the second conductive film 66, as described above. Thus, in the present embodiment, high-intensity light of a micro spot size (for example, near-field light) can be produced by the surface plasmon enhancement effect in the vicinity of the gap between the first conductive film 62 and the second conductive film 66.

When the incident light 100 shone on the optical device 60 of the present embodiment has anisotropy in the direction of polarization, and is incident with its principal direction of polarization coinciding with the opposing direction of the first conductive film 62 and the second conductive film 66, the following advantage can be obtained. In this case, the conductive film has essentially no edge region substantially parallel to the direction of polarization of the incident light 100 in the region of the emitted light from the optical device 60. Thus, the propagation loss of the surface plasmons in the edge region substantially parallel to the direction of polarization of the incident light 100 can be greatly reduced, and higher intensity light can be emitted.

The present embodiment has been described based on the exemplary configuration in which each indentation pattern formed on the surface of the conductive film on the base 61 side has the arc-shaped raised portions and recessed portions of a constant width. However, the present invention is not limited to this. Any periodic pattern can be formed as long as it can produce the surface plasmon enhancement effect on the conductive film. For example, as described in Variation 1 (FIGS. 13A and 13B), an indentation pattern of period Tg including straight-stripe raised portions of width Tg1, and straight-stripe recessed portions of width Tg2 may be formed on each conductive film.

Further, the present embodiment described an example in which the indentation pattern of each conductive film has a rectangular-wave cross sectional shape, and in which the surfaces of the raised portions and the recessed portions are flat. However, the present invention is not limited to this. The indentation pattern can have any configuration as long as it has a surface profile (conductor cross sectional shape) with which the surface plasmon enhancement effect can be produced on the conductive film. For example, each conductive film may have the cross sectional shapes described in, for example, Variation 2 (FIGS. 14 to 17).

Further, the present embodiment described an example in which the edge portion of each conductive film is in the shape of the letter L (triangular) with apex angle θ as viewed from the incident side of the incident light. However, the present invention is not limited to this. For example, the edge portion of each conductive film may have any shape according to, for example, required spot size and intended use. For example, the edge portion of each conductive film as viewed from the incident side of the incident light may have the shapes described in Variation 3 (FIGS. 18 to 24).

Figure 26A:
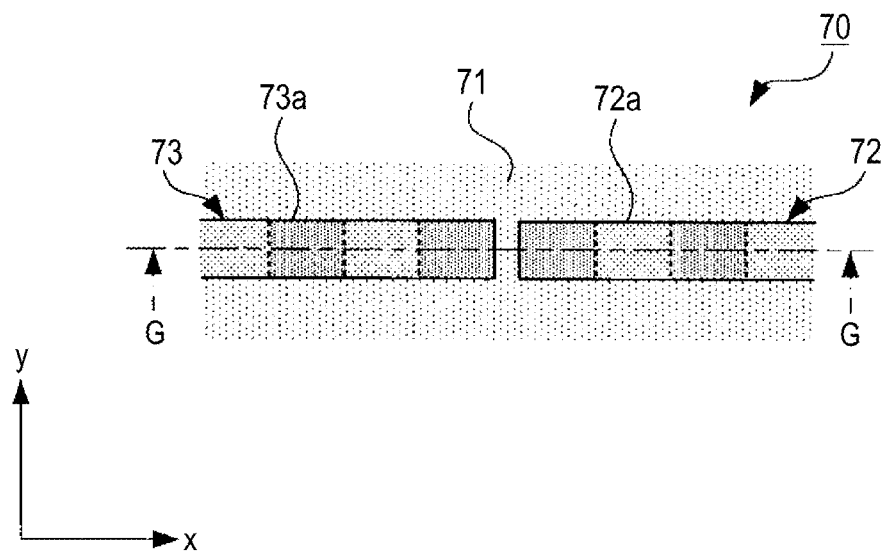
FIG. 26A is a schematic bottom view of an optical device of Variation 4.
Figure 26B:
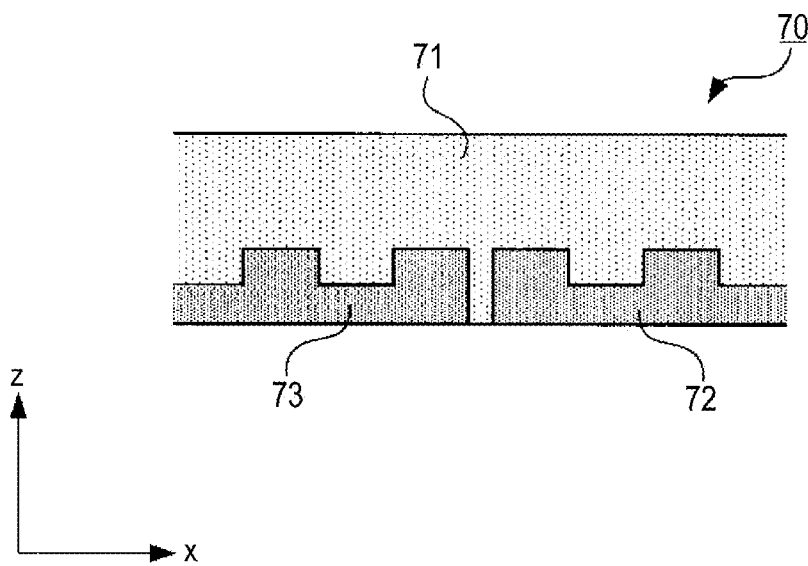
FIG. 26B is a cross sectional view taken at G-G of FIG. 26A.

FIGS. 26A and 26B illustrate an example of a schematic configuration of an optical device obtained by applying the exemplary configuration of the edge portion of FIG. 20 to the present embodiment (Variation 4). FIG. 26A is a schematic bottom view of the optical device of Variation 4, and FIG. 26B is a cross sectional view at G-G of FIG. 26A. For ease of explanation, FIGS. 26A and 26B illustrate only a region in the vicinity of the edge portion.

In this exemplary configuration, a first conductive film 72 and a second conductive film 73 formed on a base 71 have edge portions 72a and edge portions 73a, respectively, that are rectangular in shape with a constant width as viewed from the incident side of the incident light. In this example, the first conductive film 72 and the second conductive film 73 are disposed in such a manner that a flat end portion of the edge portion 72a of the first conductive film 72, and a flat end portion of the edge portion 73a of the second conductive film 73 are distant apart by a predetermined distance on opposite sides.

[Intensity Distribution of Emitted Light]

Figure 27A:
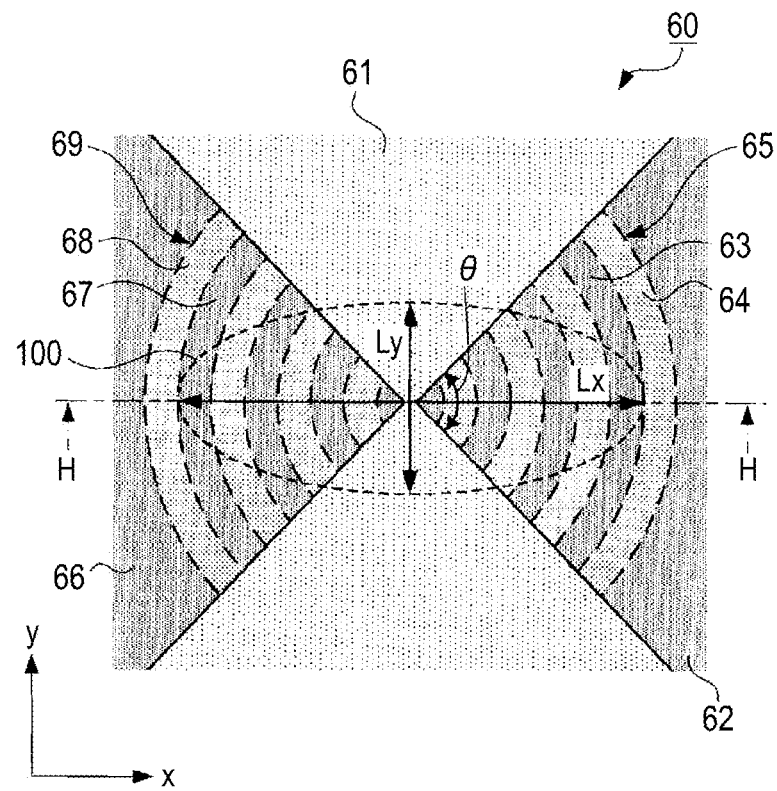
FIGS. 27A and 27B are views explaining the analysis model of a simulation analysis performed for the optical device of Second Embodiment.
Figure 27B:
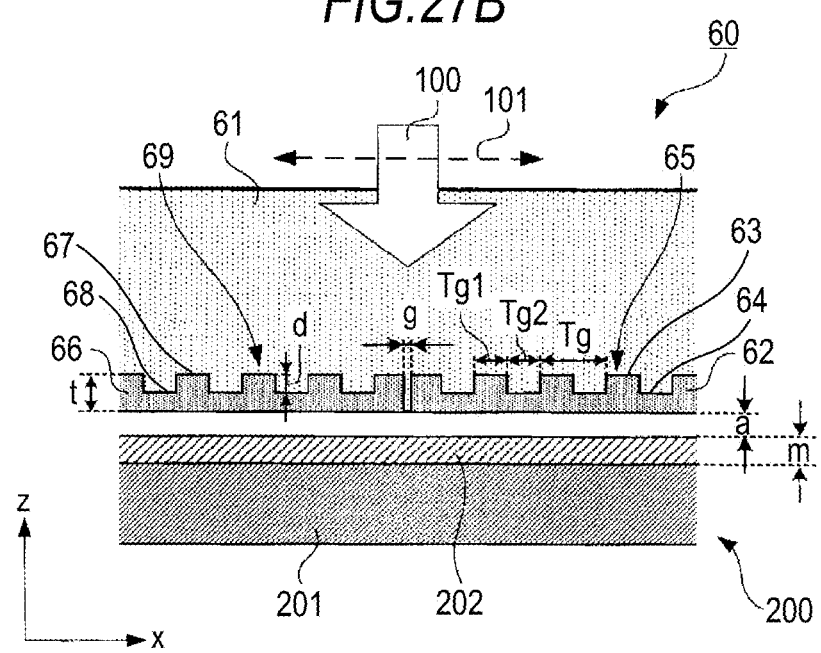

The intensity (electric field strength) distribution characteristic of emitted light in the optical device 60 of the present embodiment is described below. As in First Embodiment, the intensity distribution of emitted light in the optical device 60 of the present embodiment was calculated using an electromagnetic field analysis simulator according to the FDTD method. FIGS. 27A and 27B schematically represent the analysis model of the simulation analysis. FIG. 27A represents the relationship between the indentation pattern of each conductive film of the optical device 60 and the polarization direction of the incident light 100 in the analysis model. FIG. 27B is a cross sectional view at H-H of FIG. 27A.

As in First Embodiment, in the simulation analysis, light from the optical device 60 was shone on a recording medium 200 that included a recording layer-including information recording film 202 on a substrate 201, and the resulting electric field strength in the vicinity of the surface of the information recording film 202 was calculated. Specifically, the calculation of electric field strength was made at the position of the information recording film 202 1 nm down from the surface on the optical device 60 side upon irradiation of the recording medium 200 with the light from the optical device 60 (see Table 1).

In this analysis, as illustrated in FIG. 27A, the polarization direction 101 of the incident light 100 coincides with the opposing direction of the first conductive film 62 and the second conductive film 66 (x direction in FIG. 27A). Lx and Ly representing the $1/e^2$ total widths of the electric field strength distribution of the incident light 100 satisfy the condition Lx>Ly, as in First Embodiment. Further, the simulation analysis considers the case where the incident light 100 is shone in such a manner that the center of its light spot coincides with the center of the gap between the first conductive film 62 and the second conductive film 66.

Table 1 presented in First Embodiment represents specific calculation parameters (calculation conditions) used in the simulation analysis of the present embodiment, including the material of the optical device 60, dimension parameters, and a positional relationship between the optical device 60 and the recording medium 200. Though not included in Table 1, the apex angle θ of the edge portion of each conductive film of the optical device 60 of the present embodiment is 90°.

Figure 28A:
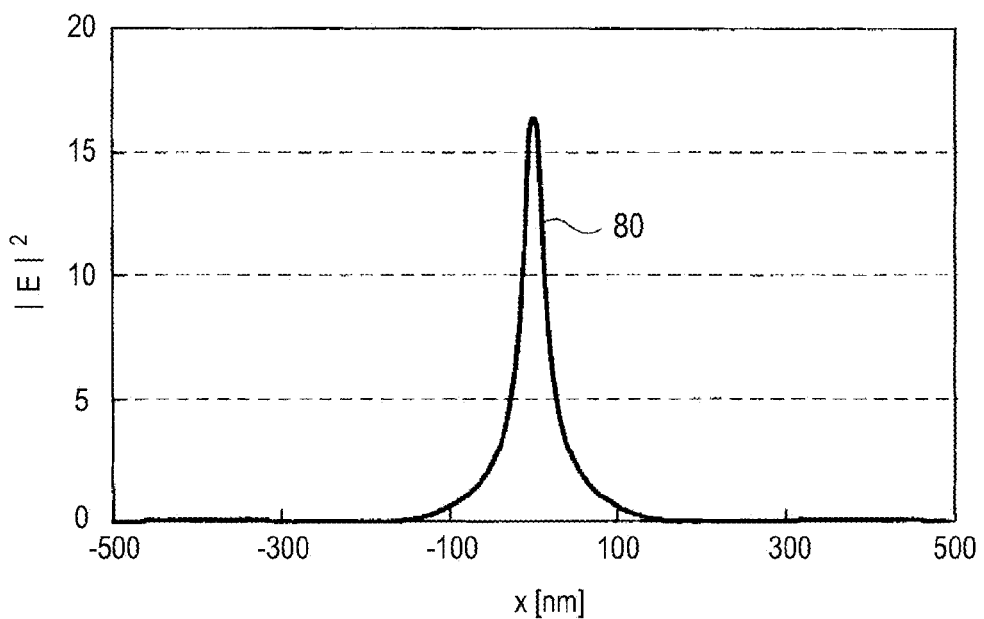
FIGS. 28A and 28B are views representing the result of the simulation analysis performed for the optical device of Second Embodiment.
Figure 28B:
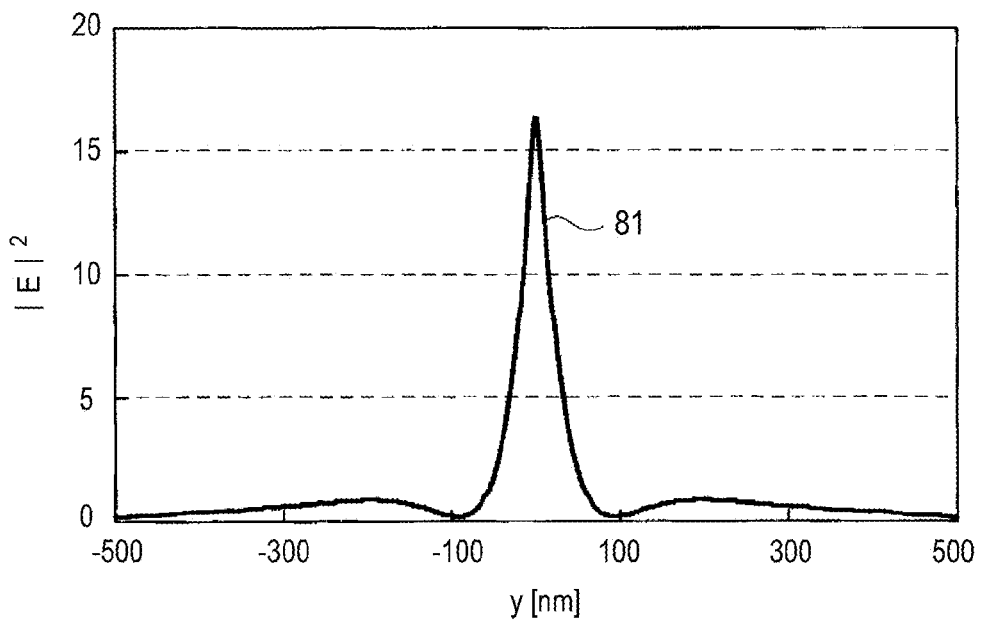

FIGS. 28A and 28B represent the results of the simulation analysis according to the present embodiment. FIG. 28A represents the distribution characteristics of the electric field strength $|E|^2$ of the emitted light along the x direction of FIG. 27A, in which the horizontal axis denotes positions along the x direction from the center of the gap between the first conductive film 62 and the second conductive film 66, and the vertical axis denotes electric field strength $|E|^2$. FIG. 28B represents the distribution characteristics of the electric field strength $|E|^2$ of the emitted light along the y direction of FIG. 27A, in which the horizontal axis denotes positions along the y direction from the center of the gap between the first conductive film 62 and the second conductive film 66, and the vertical axis denotes electric field strength $|E|^2$.

In the present embodiment, as indicated by characteristics 80 and 81 in FIGS. 28A and 28B, the peak value of the electric field strength $|E|^2$ of the emitted light was 16.3 in terms of a ratio with respect to the peak electric field strength of the incident light. The half width of the peak curve was 34 nm along the x direction, and 42 nm along the y direction. Table 2 below summarizes the results of the simulation analyses performed for the optical devices of First and Second Embodiments and Comparative Example 1. In the table, the analysis results for Comparative Example 1 are based on the circular aperture with an aperture width of 100 nm.

TABLE 2

|  | Peak value (ratio with respect to the peak value of incident light intensity) | half width [nm] (x direction) | half width [nm] (y direction) |
|---|---|---|---|
| First Embodiment | 5.6 | 74 | 102 |
| Second Embodiment | 16.3 | 34 | 42 |
| Comparative Example 1 (aperture size: 100 nm) | 0.356 | 116 | 98 |

It can clearly be seen in Table 2 that the optical device 60 of the present embodiment is capable of producing higher intensity light with a smaller micro spot size than that obtained in Comparative Example 1. Further, as is clear from the comparison of the evaluation results between the present embodiment and First Embodiment, the optical device 60 of the present embodiment is capable of producing even higher intensity light with a smaller micro spot size than that obtained in First Embodiment.

The results therefore show that light of an even smaller spot size can be produced by disposing a pair of conductive films face to face along the direction of polarization of the incident light 100 as in the optical device 60 of the present embodiment. It can also be seen that the optical device 60 of the present embodiment can produce light of even higher output intensity, and thus can use the power of the incident light even more efficiently.

Comparative Example 2

An optical device of a structure similar to the optical device 60 of Second Embodiment has been proposed in related art, specifically an optical device of a structure in which two conductors having triangular surfaces are disposed distant apart with a predetermined gap (hereinafter, "bow-tie optical device"). In this example, such a bow-tie optical device of related art is compared with the optical device 60 of Second Embodiment with regard to the intensity (electric field strength) distribution characteristics of emitted light.

Figure 29:
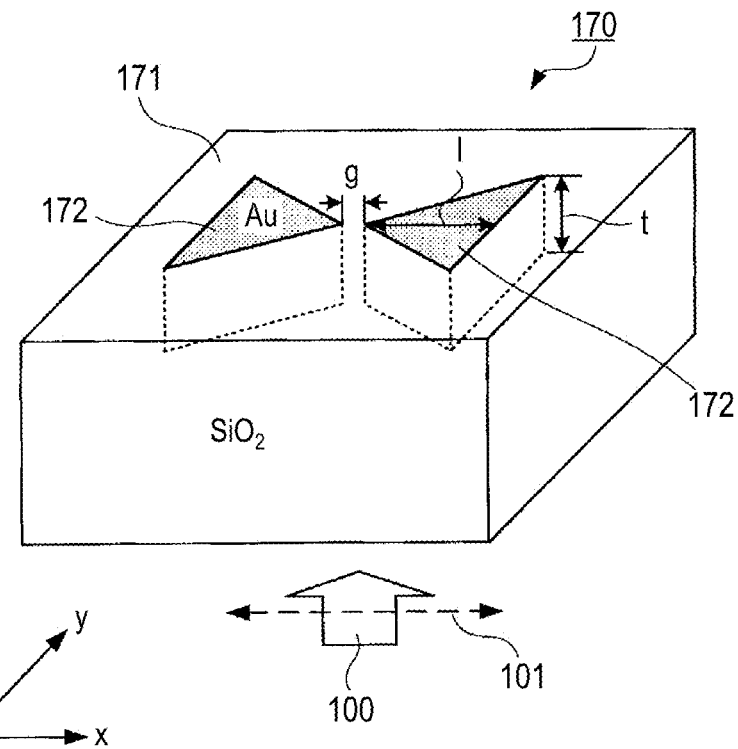
FIG. 29 is a view schematically illustrating a configuration of an optical device of Comparative Example 2.

FIG. 29 illustrates a schematic configuration of the bow-tie optical device of Comparative Example 2. A bow-tie optical device 170 is configured to include a base 171, and two conductors 172 formed on one of the surfaces of the base 171. The conductors 172 are disposed face to face so that their apex angles are separated from each other by a predetermined gap. Further, in the bow-tie optical device 170 of Comparative Example 2, the incident light 100 (propagation light) from a light source (not illustrated) is incident on the base 171 from the side not provided with the conductors 172.

In the bow-tie optical device 170, upon incidence of the incident light 100 on the conductors 172 via the base 171, charge is induced on the surfaces between the conductors 172, and surface plasmon resonance occurs. As a result, light of a spot size smaller than the wavelength of the incident light is produced between the conductors 172.

As in First Embodiment, the intensity distribution of emitted light was also calculated for the bow-tie optical device 170 of the configuration illustrated in FIG. 29, using an electromagnetic field analysis simulator according to the FDTD method. As in First Embodiment, in the simulation analysis, light from the bow-tie optical device 170 was shone on a recording medium 200 that included a recording layer-including information recording film 202 on a substrate 201, and the resulting electric field strength in the vicinity of the surface of the information recording film 202 was calculated. Specifically, the calculation of electric field strength was made at the position of the information recording film 202 1 nm down from the surface on the bow-tie optical device 170 side upon irradiation of the recording medium 200 with the light from the bow-tie optical device 170.

In the simulation analysis of the bow-tie optical device 170, $SiO_2$ was used as the material of the base 171, and Au as the material of the conductors 172. The apex angle θ of the conductors 172 was 90°, the length l of each conductor 172 along the opposing direction of the conductors 172 was 240 nm, and the thickness t of each conductor 172 was 100 nm. The gap g between the conductors 172 was 12 nm.

The length l and thickness t of each conductor 172 in the bow-tie optical device 170 were set to these values for the following reason.

Figure 30:
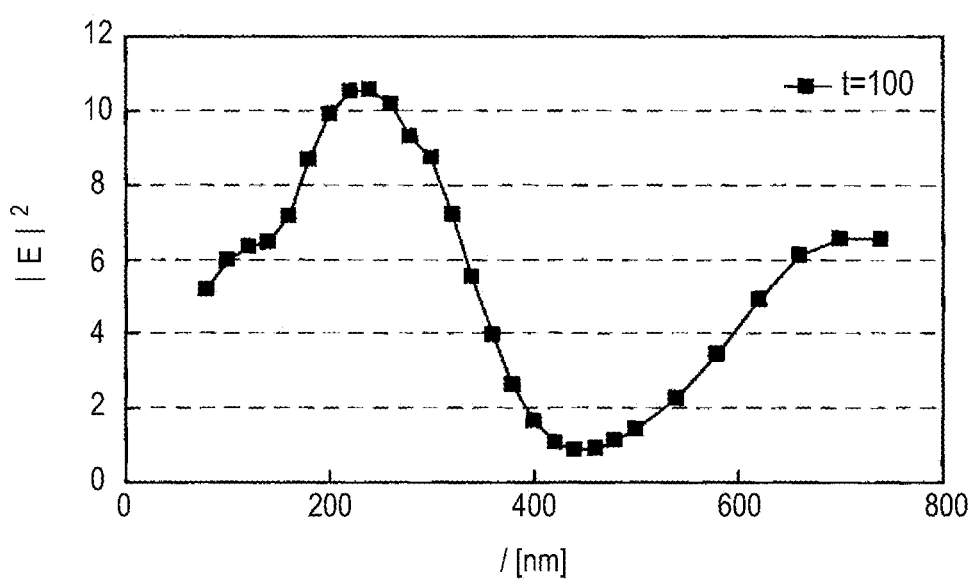
FIG. 30 is a view representing the relationship between the length of a conductor of the optical device of Comparative Example 2, and the electric field strength of emitted light.

FIG. 30 represents the relationship between the length l of the conductor 172 having a thickness t of 100 nm, and the electric field strength $|E|^2$ of emitted light in the bow-tie optical device 170. As is clear from this relationship, the electric field strength $|E|^2$ of the emitted light is maximized when the length l of the conductor 172 is about 240 nm.

Figure 31:
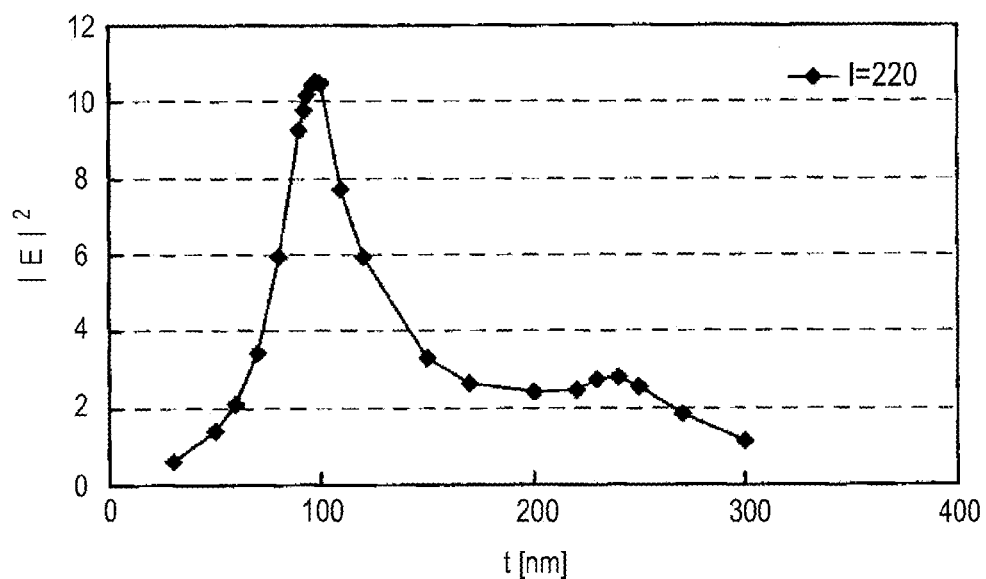
FIG. 31 is a view representing the relationship between the thickness of the conductor of the optical device of Comparative Example 2, and the electric field strength of emitted light.

FIG. 31 represents the relationship between the thickness t of the conductor 172 having a length l of 220 nm, and the electric field strength $|E|^2$ of emitted light in the bow-tie optical device 170. As is clear from this relationship, the electric field strength $|E|^2$ of the emitted light is maximized when the thickness t of the conductor 172 is about 100 nm. Thus, in the simulation analysis of the bow-tie optical device 170 illustrated in FIG. 29, values that would maximize the electric field strength $|E|^2$ of emitted light were selected for the length l and thickness t of the conductor 172.

In the simulation analysis of the bow-tie optical device 170 of Comparative Example 2, the parameters of the incident light 100 (including spot shape, wavelength, direction of polarization, and power) are the same as the conditions presented in Table 1. Conditions regarding the configuration of the recording medium 200 are also the same as those of Table 1.

In this example, a simulation analysis was performed under the parameter conditions of Table 1 except that the period Tg of the indentation pattern of each conductive film of the optical device 60 of Second Embodiment was set to 480 nm. The analysis result was then compared with the result from Comparative Example 2.

Figure 32:
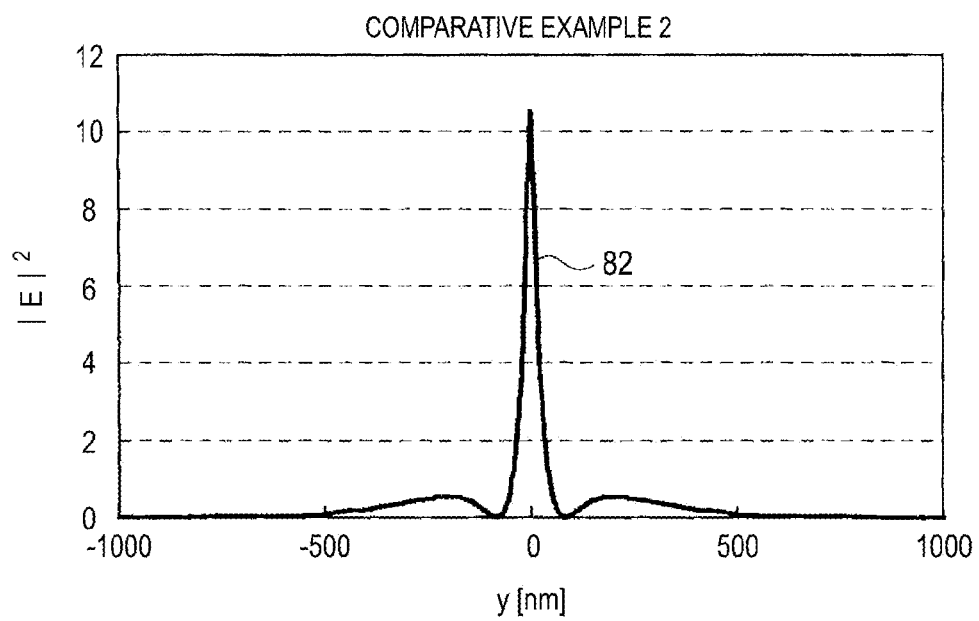
FIG. 32 represents the distribution characteristic of the electric field strength of emitted light in the optical device of Comparative Example 2.

FIG. 32 shows the result of the simulation analysis performed for the bow-tie optical device 170 of Comparative Example 2. FIG. 32 represents the distribution characteristic of the electric field strength $|E|^2$ of emitted light along the y direction in FIG. 29, in which the horizontal axis denotes positions along the y direction from the center of the gap between the two conductors 172, and the vertical axis represents electric field strength $|E|^2$.

Figure 33:
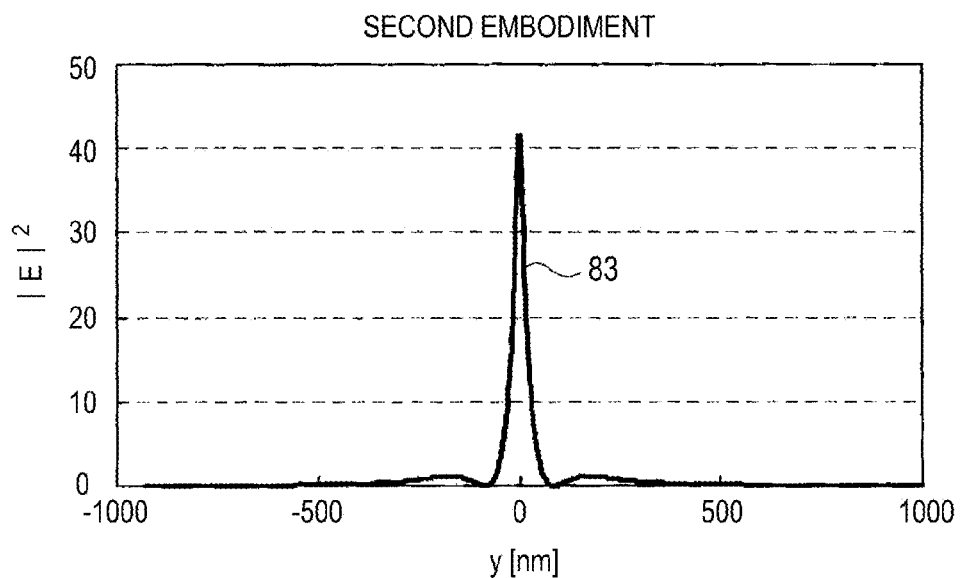
FIG. 33 represents the distribution characteristic of the electric field strength of emitted light in the optical device of Second Embodiment.
Figure 34:
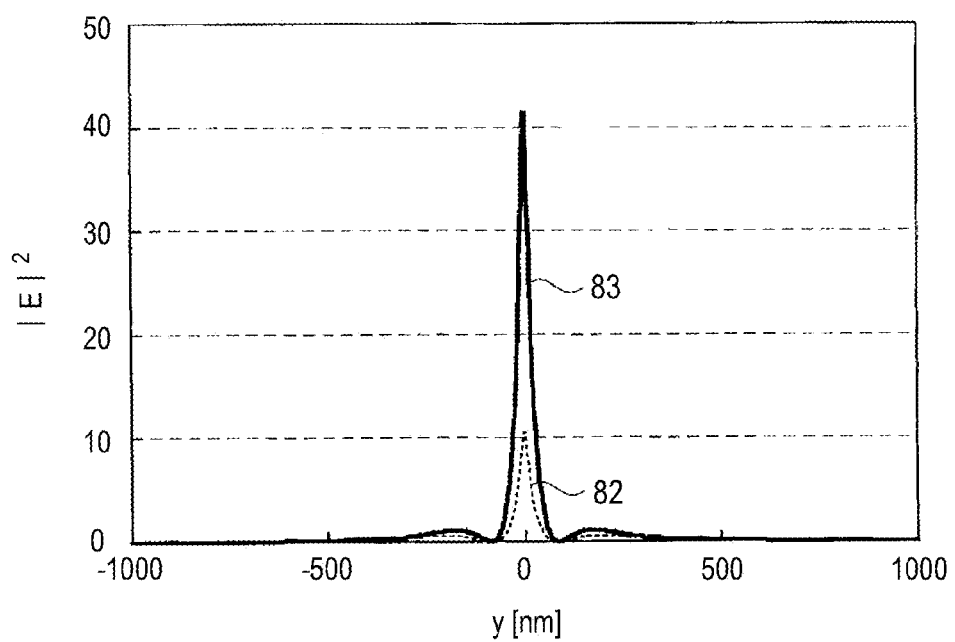
FIG. 34 is a view comparing the electric field strength distribution of the optical device of Second Embodiment, and the electric field strength distribution of the optical device of Comparative Example 2.

FIG. 33 shows the result of the simulation analysis performed for the optical device 60 of Second Embodiment. FIG. 33 represents the distribution characteristic of the electric field strength $|E|^2$ of emitted light along the y direction in FIG. 27A, in which the horizontal axis denotes positions along the y direction from the center of the gap between the first conductive film 62 and the second conductive film 66, and the vertical axis represents electric field strength $|E|^2$. FIG. 34 shows a graph representing the characteristics of FIG. 32 and FIG. 33 together. In FIG. 34, the characteristic indicated by broken line is the characteristic 82 of FIG. 32, and the characteristic indicated by solid line is the characteristic 83 of FIG. 33.

From the result of simulation analysis, the electric field strength $|E|^2$ of emitted light in the bow-tie optical device 170 of Comparative Example 2 was found to be about 10.6 in terms of a ratio with respect to the peak electric field strength of the incident light (see the characteristic 82 in FIG. 32). In contrast, in the optical device 60 of Second Embodiment, the electric field strength $|E|^2$ of emitted light was about 41.5 in terms of a ratio with respect to the peak electric field strength of the incident light (see the characteristic 83 in FIG. 33). In other words, the optical device 60 of Second Embodiment was shown to be capable of producing a maximum electric field strength about 4 times greater than that in the bow-tie optical device 170 of related art (see FIG. 34).

Further, the optical device 60 of Second Embodiment is advantageous over the bow-tie optical device 170 of Comparative Example 2 in the following respects except for the intensity of the emitted light. In the bow-tie optical device 170 of Comparative Example 2, the length l of the conductor 172 in the opposing direction (x direction in FIG. 30) of the conductors 172 is set so as to resonate the surface plasmons. As such, the length l of the conductor 172 is restricted by the resonance conditions of the surface plasmons. In contrast, in the optical device 60 of Second Embodiment, the length of each conductive film in the opposing direction of the first conductive film 62 and the second conductive film 66 can be set irrespective of the resonance conditions of the surface plasmons. Second Embodiment is therefore advantageous over Comparative Example 2 in terms of ease of design.

In the bow-tie optical device 170 of Comparative Example 2, because the length l of the conductor 172 is restricted by the resonance conditions of the surface plasmons, it is difficult to provide a sufficient length for the conductors 172. Thus, in the bow-tie optical device 170 of Comparative Example 2, the conductors 172 are generally confined within the light spot of the incident light during irradiation. In this case, some near-field light is produced in a side portion region on the opposite side of the apex at the gap of the conductor 172. Further, some of the incident light is transmitted in the side portion region of the conductor 172. In this manner, a light leak may occur in the side portion region on the opposite side of the apex at the gap of the conductor 172, and it may influence the intensity distribution of the near-field light produced between the conductors 172.

In contrast, in the optical device 60 of Second Embodiment, a sufficient length can be provided for each conductive film along the opposing direction of the first conductive film 62 and the second conductive film 66, as described above. Thus, in the optical device 60 of Second Embodiment, the light leak problem can be solved because the region of the conductive films can be made greater than the size of the light spot of the incident light.

[Variation 5]

When the optical devices described in First and Second Embodiments and in the foregoing Variations are used for, for example, a recording and reproducing apparatus of a thermal assist magnetic recording scheme, the optical device is mounted on the magnetic head. Because the optical device is mounted by being integrated with the magnetic head, the configuration of the optical device should be selected taking into account the compatibility between the manufacturing processes of the optical device and the magnetic head.

The following considers the case where the magnetic head and the optical device are mounted at, for example, the front end portion of a flying slider. In this case, because the elements of the magnetic head and the optical device are sequentially laminated at the front end surface of the flying slider, it is preferable, in terms of a manufacturing process, that the conductive film of the optical device have a constant thickness in the laminate direction, specifically a constant width on the light irradiated surface. Specifically, when the magnetic head and the optical device are mounted at, for example, the front end portion of a flying slider, it is preferable to use, in terms of a manufacturing process, the optical device 70 of the configuration described in Variation 4 (FIGS. 26A and 26B).

Figure 35:
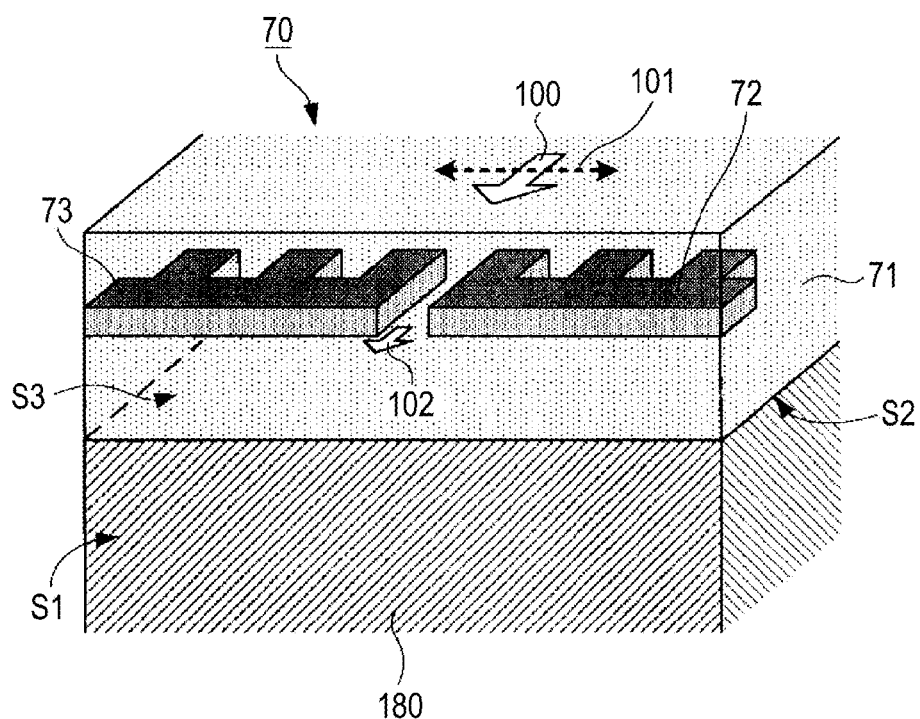
FIG. 35 is a view illustrating an example of a mount configuration of the optical device of Variation 4 on a flying slider.

FIG. 35 illustrates a schematic configuration in the vicinity of the optical device 70 of Variation 4 mounted on the front end surface of a flying slider. Here, the first conductive film 72 and the second conductive film 73 are formed in such a manner that the surface orthogonal to the light-receiving face (indentation pattern side) of the first conductive film 72 and the second conductive film 73 of the optical device 70 faces a front end face S2 of a slider main body 180 via the base 71. Further, the first conductive film 72 and the second conductive film 73 are formed so that the opposing direction of the first conductive film 72 and the second conductive film 73 coincides with the polarization direction of the incident light 100. Further, the first conductive film 72 and the second conductive film 73 are formed so that the light-receiving face of the first conductive film 72 and the second conductive film 73 are on the incident side of the incident light 100, and that the end surface on the opposite side of the light-receiving face of the first conductive film 72 and the second conductive film 73 is exposed on a light emitting face S3.

In the exemplary mount configuration of FIG. 35, the optical device 70 is fabricated in the following manner. First, a first insulating layer (not illustrated) that forms the base 71 is formed on the front end face S2 of the slider main body 180 orthogonal to an opposing face S1 that faces a recording medium, using techniques, for example, such as sputtering. Then, the first conductive film 72 and the second conductive film 73 are formed on the first insulating layer using techniques, for example, such as sputtering. A second insulating layer that forms the base 71 is then formed on the first conductive film 72 and the second conductive film 73 using techniques, for example, such as sputtering. The optical device 70 is fabricated on the front end face S2 of the slider main body 180 in this manner.

In the exemplary mount configuration of the optical device 70 illustrated in FIG. 35, the spot size of a micro light 102, for example, such as near-field light, emitted by the optical device 70 is determined by the distance between the first conductive film 72 and the second conductive film 73, and the thickness of the first conductive film 72 and the second conductive film 73. Thus, in order to produce light of smaller sizes, the thickness of the first conductive film 72 and the second conductive film 73 needs to be reduced further. However, a reduced thickness of the first conductive film 72 and the second conductive film 73 means a reduced area of the light-receiving face for the incident light 100, and thus a reduced conversion efficiency from the incident light 100 to the micro light 102.

Variation 5 describes an exemplary configuration of an optical device that can solve the foregoing problem, and that can be manufactured by a process highly compatible with the manufacturing process of, for example, a magnetic head.

Figure 36:
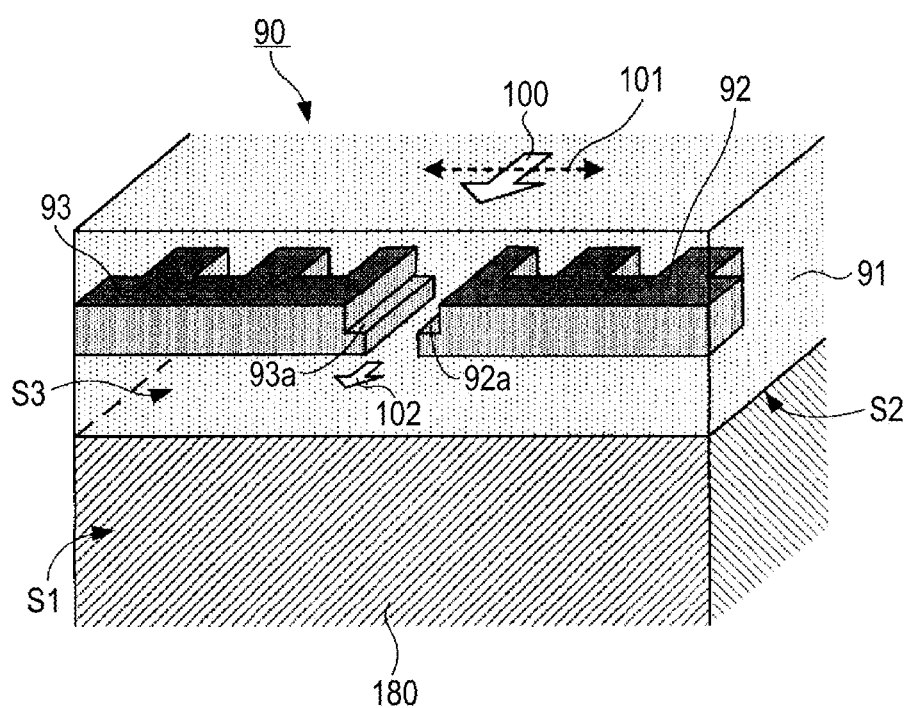
FIG. 36 is a view illustrating an example of a mount configuration of an optical device of Variation 5 on a flying slider.

FIG. 36 illustrates a schematic configuration of the optical device of such a configuration mounted on the front end face S2 of the slider main body 180. In FIG. 36, elements analogous to those described in the mounting of the optical device 70 of Variation 4 illustrated in FIG. 35 are shown with the same reference numerals.

An optical device 90 of this example is configured to include a base 91, and a first conductive film 92 and a second conductive film 93 formed on the light emitting face S3 side of the base 91. The layout of the first conductive film 92 and the second conductive film 93 is the same as that of the optical device 70 of Variation 4 illustrated in FIG. 35. Further, as in the optical device of Variation 4, the indentation pattern is formed on each conductive film on the side receiving the incident light 100.

However, in the optical device 90, the first conductive film 92 and the second conductive film 93 include opposing surfaces 92a and 93a, respectively, each having a step along the opposing direction of the first conductive film 92 and the second conductive film 93. Specifically, in this example, the opposing surfaces 92a and 93a of the first conductive film 92 and the second conductive film 93 are step-like in shape. In this configuration, the end portion of each conductive film is thinner than the other regions of the conductive film.

Further, in this example, the opposing surfaces 92a and 93a are step-like in shape such that the thin end portion of the first conductive film 92 on the side of the second conductive film 93 faces the thin end portion of the second conductive film 93 on the side of the first conductive film 92. In this example, each opposing surface is described as having a single step. However, the present invention is not limited to this, and more than one step may be provided for each opposing surface. Further, the opposing surface may be tapered. Further, the thin end portion of each opposing surface may be at the center of the opposing surface.

According to the configuration of this example, the thickness of the conductive films can be reduced only in regions (end portions) where the distance between the conductive films is minimized, specifically only in regions where the micro light 102, for example, such as near-field light, is to be produced, and a sufficient thickness can be provided for other regions of the conductive films.

Thus, the optical device 90 is able to emit the micro light 102 in a size comparable to that emitted by the optical device 70 of Variation 4. Further, because the optical device 90 can have an increased light-receiving face for the incident light, the coupling efficiency between the incident light 100 and the conductive film can be increased, and a reduction in the conversion efficiency from the incident light 100 to the micro light 102 can be suppressed.

The manufacturing method of the optical device 90 is as in the method described in Variation 4, except that the method additionally includes the step of forming a step on the opposing surfaces of the conductive films. Thus, there is high compatibility between the manufacturing processes of the optical device 90 and the magnetic head that are mounted on a slider. In other words, in this example, the incident light 100 can be utilized with improved efficiency while maintaining the compatibility with the manufacturing process of the magnetic head, and the spot size of the micro light.

The step-like opposing surfaces of the conductive films in the optical device 90 can be formed using, for example, the following method (1) or (2).

(1) The conductive films are formed in a thickness desired for the thicker region. Then, the opposing end portions of the conductive films are partially removed by etching.

(2) The conductive films are formed in a thickness desired for the thinner region (opposing end portions). Then, a conductive film is laminated on regions of these conductive films other than the opposing end portions.

Figure 37:
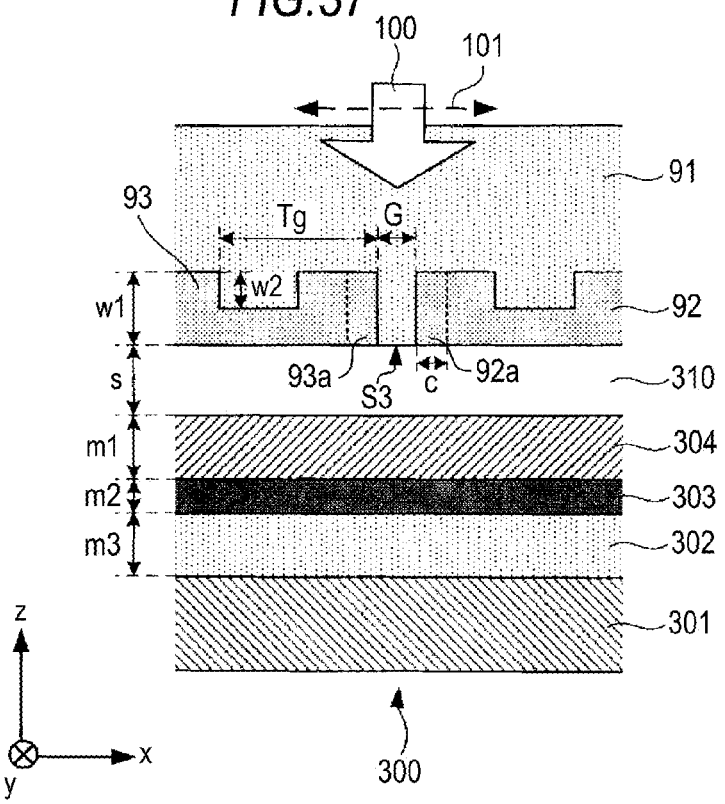
FIG. 37 is a view explaining the analysis model of a simulation analysis performed for the optical device of Variation 5.

Simulation analysis confirmed that the optical device 90 has the effects described above. FIG. 37 illustrates a schematic configuration of the simulation model of the optical device used in the simulation analysis. In this simulation model, the base 91 of the optical device 90 is formed of $Al_2O_3$, and the first conductive film 92 and the second conductive film 93 are formed of Au. A recording medium 300 disposed to face the optical device 90 via an air layer 310 includes a substrate 301 of $SiO_2$, and a Cu layer 302, a MgO layer 303, and an Fe layer 304 (recording layer) sequentially formed on the substrate 301.

For comparison, a similar simulation analysis was performed for the optical device 70 of Variation 4. In the analysis, the thickness of the conductive films of Variation 4 was set to the thickness of the end portions of the conductive films of Variation 5 so as to produce a light spot of substantially the same size in the optical devices 70 and 90. Table 3 below presents specific simulation conditions of the optical device 90 of Variation 5 and the optical device 70 of Variation 4

TABLE 3

|  | Variation 5 | Variation 4 |
| --- | --- | --- |
| t1 [nm] | 60 | 20 |
| t2 [nm] | 20 | 20 |
| Tg [nm] | 130 | 100 |
| w1 [nm] | 50 | 50 |
| w2 [nm] | 50 | 50 |
| G [nm] | 20 | 20 |
| c [nm] | 20 | — |
| s [nm] | 7.5 | 7.5 |
| m1 [nm] | 12.5 | 12.5 |
| m2 [nm] | 5 | 5 |
| m3 [nm] | 50 | 50 |

In Table 3, t2 is the thickness of the end portion of each conductive film on the opposing surfaces of the conductive films, and t1 is the thickness of the conductive films in regions other than the end portion. Tg is the period of the indentation pattern of the conductive film. The symbol w1 is the width of the raised portion of the conductive film, and w2 is the difference in width between the raised portion and the recessed portion of the conductive film. G is the distance (gap) between the conductive films. The symbol c is the length of the end portion of each conductive film along the opposing direction of the conductive films.

Further, in Table 3, the symbol s is the thickness of the air layer 310, specifically the distance between the light emitting face S3 of the optical device 90 and the Fe layer 304 of the recording medium 300. The symbol m1 is the thickness of the Fe layer 304, m2 the thickness of the MgO layer 303, and m3 the thickness of the Cu layer 302.

The optimum period for the indentation pattern of the conductive film depends on thickness, and as such the period Tg of the indentation pattern of each Variation is optimized in the simulation analysis. Accordingly, the period Tg of each Variation is different in Table 3.

In the simulation analysis, the light intensity distributions in the recording medium were calculated using an electromagnetic field analysis simulator according to the FDTD method as in First Embodiment. Specifically, light intensity distributions were calculated in the in-plane directions of the light emitting face S3 along the opposing direction of the conductive films (x direction in FIG. 37) and along the direction orthogonal to the opposing direction (y direction in FIG. 37). The results are shown in FIGS. 38 and 39.

Figure 38:
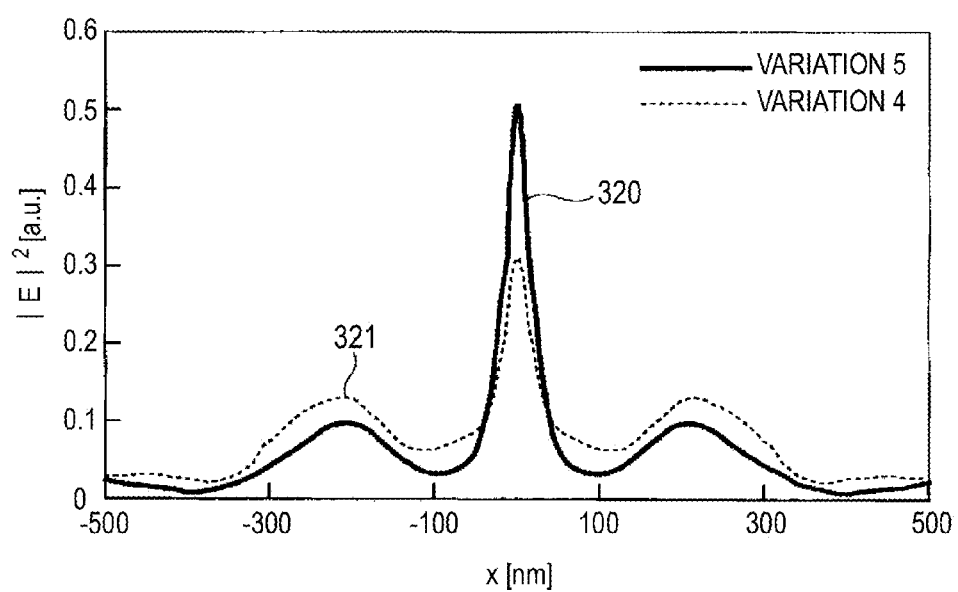
FIG. 38 is a view representing the result of the simulation analysis performed for the optical device of Variation 5.

FIG. 38 represents the distribution characteristics of the electric field strength $|E|^2$ of emitted light along the x direction, in which the horizontal axis denotes positions along the x direction from the center of the gap between the conductive films, and the vertical axis denotes electric field strength $|E|^2$. FIG. 39 represents the distribution characteristics of the electric field strength $|E|^2$ of emitted light along the y direction, in which the horizontal axis denotes positions along the y direction from the center of the gap between the conductive films, and the vertical axis denotes electric field strength $|E|^2$. In FIGS. 38 and 39, characteristics 320 and 322 indicated by solid line are characteristics obtained in the optical device 90 of Variation 5, and characteristics 321 and 323 indicated by broken line are characteristics of the optical device 70 of Variation 4.

Figure 39:
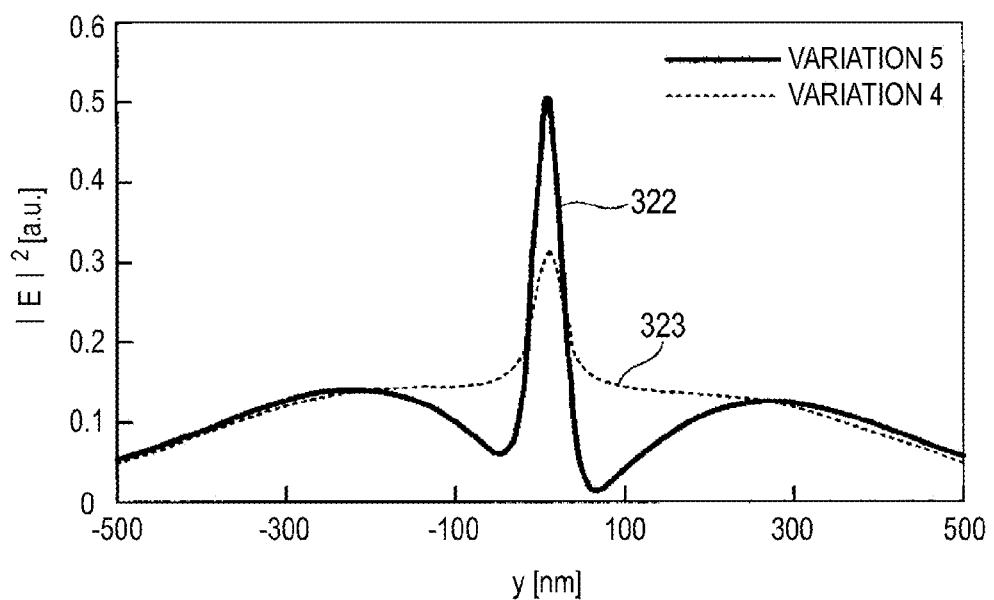
FIG. 39 is a view representing the result of the simulation analysis performed for the optical device of Variation 5.

By comparing the peak values of electric field strength $|E|^2$ in the characteristics shown in FIGS. 38 and 39, it can be seen that the peak value of the electric field strength $|E|^2$ of the optical device 90 of Variation 5 exceeds that of Variation 4 by a factor of about 1.6. It can also be seen from the characteristics shown in FIGS. 38 and 39 that the shape of the light spot obtained in Variation 5 is sharper than that of Variation 4.

The simulation analyses confirmed that the configuration of Variation 5 was able to improve the efficiency of utilizing the incident light 100 while maintaining the spot size of the micro light.

This example described the step-like opposing surface configuration of the conductive films based on the optical device 70 of Variation 4. However, the present invention is not limited to this. For example, the step-like end portion may be provided in the optical device that includes only one of the conductive films provided in the optical device 70 of Variation 4, specifically the optical device 44 of Variation 3-3 (FIG. 20). The effect obtained in Variation 5 can also be obtained in this case.

3. Third Embodiment

Third Embodiment describes an exemplary configuration of a recording and reproducing apparatus (optical apparatus) that uses the optical devices described in the foregoing exemplary First and Second Embodiments and Variations. In the present embodiment, a recording and reproducing apparatus will be described that records and/or reproduces information using the near-field light shone on a recording medium from the optical device.

[Configuration of Recording and Reproducing Apparatus]

Figure 40:
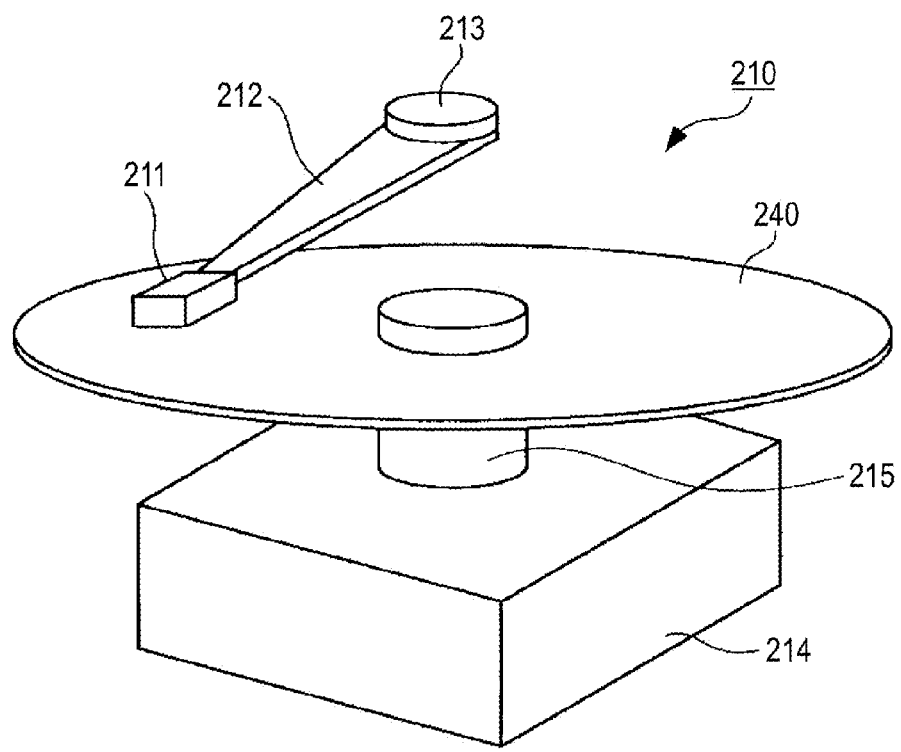
FIG. 40 is a diagram schematically illustrating a configuration of a recording and reproducing apparatus according to Third Embodiment.

FIG. 40 illustrates an exemplary schematic configuration of a recording and reproducing system including a recording medium installed in the recording and reproducing apparatus of the present embodiment. A recording and reproducing apparatus 210 mainly includes a flying slider head 211, a suspension 212 that supports the flying slider head 211, a head actuator 213 that drives the flying slider head 211, and a spindle 214 that rotatably drives a recording medium 240. The recording medium 240 is anchored on a rotating shaft 215 of the spindle 214.

In the present embodiment, the recording medium 240 is, for example, a disc-shaped medium, and includes a substrate 241, and a recording layer-containing information recording film 242 formed on the substrate 241 (see FIG. 42, described later). The recording medium 240 is mounted on the spindle 214 in such a manner that an information recording film 242 of the recording medium 240 faces the bottom face of the flying slider head 211. The recording medium 240 may be, for example, a magneto-optical recording medium, a magnetic recording medium, a phase-change medium, or a dye medium. A thin layer of lubricant or a thin protective film is appropriately formed on the surface of the recording medium 240 to prevent damage caused by the contact between the flying slider head 211 and the recording medium 240 during the operation of the recording and reproducing apparatus 210.

Figure 41:
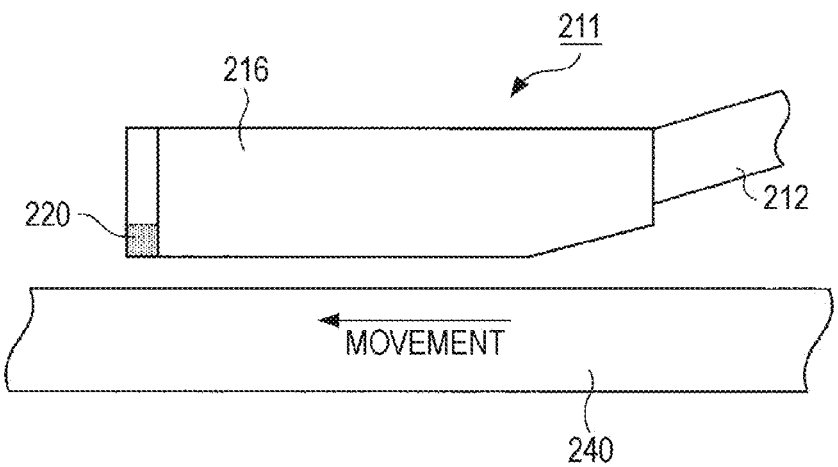
FIG. 41 is an enlarged side view in the vicinity of a flying slider head in the recording and reproducing apparatus of Third Embodiment.

FIG. 41 is an enlarged side view in the vicinity of the flying slider head 211 of the recording and reproducing apparatus 210 of the present embodiment. In the present embodiment, a flying slider-type head is used as the information recording head for the recording medium 240. The flying slider head 211 includes a slider main body 216 and an optical head 220 attached to the front end portion of the slider main body 216.

During the operation of the recording and reproducing apparatus 210, the slider main body 216 is disposed near the recording medium 240 on the opposite side. Accordingly, the optical head 220 is also disposed on the opposite side of the recording medium 240. The optical head 220 includes the optical device of the embodiment of the present invention, and performs recording and/or reproducing of information by irradiating the recording medium 240 with the near-field light produced by the optical device.

Figure 42:
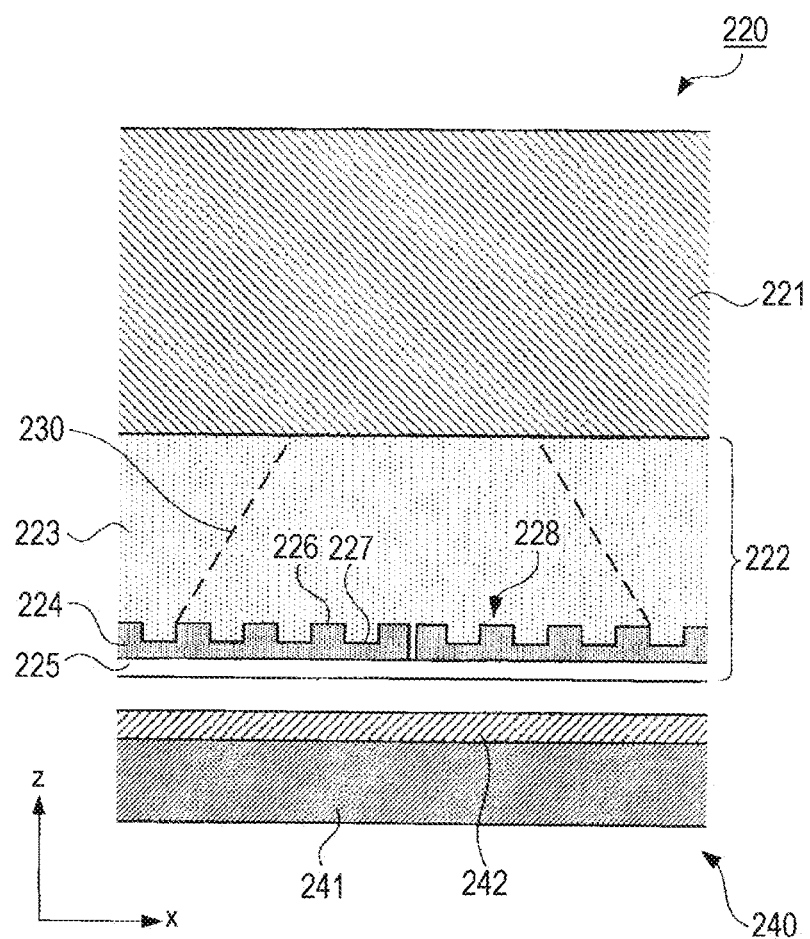
FIG. 42 is a cross sectional view schematically illustrating a configuration of an optical head in the recording and reproducing apparatus of Third Embodiment.
Figure 43:
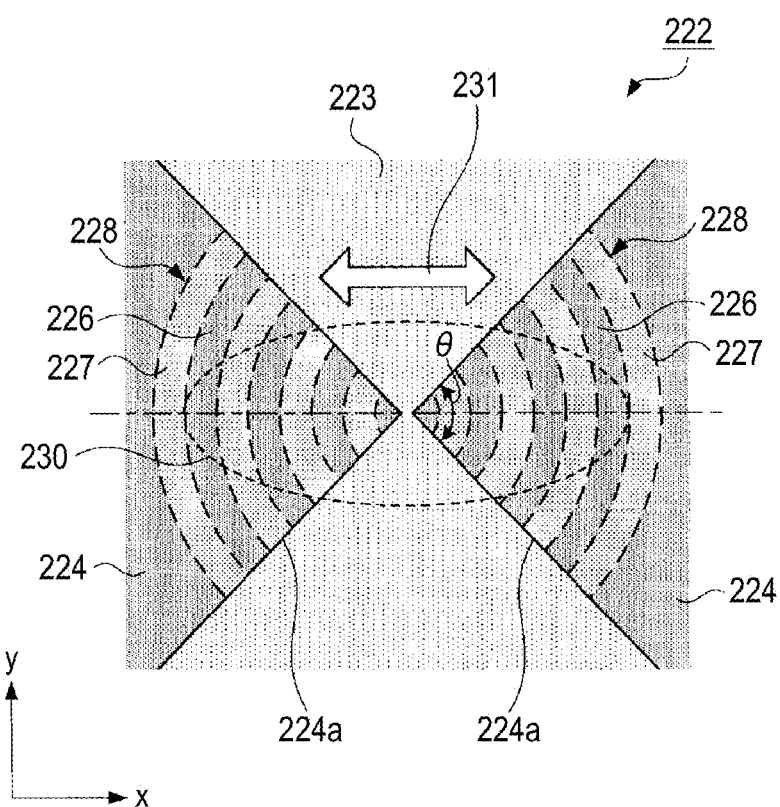
FIG. 43 is a schematic bottom view of an optical device used in the recording and reproducing apparatus of Third Embodiment.

FIGS. 42 and 43 illustrate a schematic configuration of the optical head 220 mounted on the flying slider head 211 of the present embodiment. FIG. 42 is a schematic cross sectional view of the optical head 220. FIG. 43 is a schematic bottom view of the optical head 220.

The optical head 220 of the present embodiment includes a light source 221, and an optical device 222 provided on the light emitting side of the light source 221.

The light source 221 is configured as, for example, a laser diode (LD). In the present embodiment, a light source that emits linearly-polarized light 230 is used as the light source 221. Note that the light source 221 may be, for example, a light source that emits elliptically polarized light, circularly polarized light, or randomly polarize light.

In the present embodiment, the light source 221 emits light 230 (incident light) to the optical device 222 in such a manner that the polarization direction 231 of the light 230 coincides with the opposing direction (x direction in FIG. 43) of a pair of conductive films 224 (described later).

The optical device 222 may be configured as any of the optical devices described in First and Second Embodiments and the Variations. The optical device 222 illustrated in FIGS. 42 and 43 is, for example, an optical device of the configuration described in Second Embodiment (FIGS. 25A and 25B).

The optical device 222 includes a base 223, a pair of conductive films 224 formed in portions of the base 223 on the surface opposite from the light source 221 (the surface on the side of the recording medium 240), and a light transmissive film 225 formed on the surfaces of the conductive films 224 on the side of the recording medium 240.

The base 223 is a plate-like light transmissive member, and has the same configuration as the base 61 described in Second Embodiment. The base 223 can be formed using the same base materials described in First and Second Embodiments. For example, the base 223 can be formed using optically transparent material such as optical glass and $SiO_2$.

Each conductive film 224 is a metallic film having an edge portion 224a that has a form of a protrusion as viewed from the incident side of the incident light 230, and has the same configuration as the first conductive film 62 and the second conductive film 66 of Second Embodiment. The conductive films 224 each include an indentation pattern 228 that includes, as in Second Embodiment, arc-shaped raised portions 226 (the innermost raised portion 226 is fan-shaped) of a constant width, and arc-shaped recessed portion 227 of a constant width. The raised portions 226 and the recessed portions 227 are alternately disposed in a concentric fashion, outwardly from the end portion of the edge portion 224a of the conductive film 224. The conductive films 224 are disposed so that their end portions are separated from each other by a predetermined gap on opposite sides.

The conductive films 224 can be formed using the same conductive film materials described in First and Second Embodiments. For example, the conductive films 224 may be metallic films of Au, Ag, or Cu.

The light transmissive film 225 is provided to prevent damage caused by the contact with the recording medium 240 during the operation of the recording and reproducing apparatus 210. It is therefore preferable to use, for example, materials with high mechanical strength, such as diamond-like carbon (DLC), as the material of the light transmissive film 225. The light transmissive film 225 may be formed using the same materials used for the base 223.

In the optical head 220 of the foregoing configuration, the light 230 emitted by the light source 221 is incident between the conductive films 224 via the base 223 of the optical device 222. By the surface plasmon enhancement effect produced on the surface of each conductive film 224, light energy concentrates at the end portions of the conductive films 224, and as a result high-intensity light of a micro spot size, namely, near-field light, is produced between the conductive films 224. To further enhance the surface plasmon enhancement effect, it is preferable to increase, as much as possible, the number of indentations of the indentation pattern 228 that falls within the light spot region (region surrounded by dotted line in FIG. 43).

As described above, in the optical head 220 of the present embodiment, the incident light 230 is incident between the conductive films 224 via the base 223. However, the present invention is not limited to this. For example, a lens or a waveguide may be formed in the light path of the incident light 230 in the base 223, using, for example, materials having different refractive indices, so that the incident light 230 from the light source 221 can be efficiently propagated to the conductive films 224.

The optical head 220 of the present embodiment may be adapted to perform both recording and reproducing of information using near-field light, or may be a recording-only head. When the optical head 220 is used as a recording-only head, a reproducing-only head is separately provided. In this case, the reproducing-only head may be provided on the optical head 220 side, and information may be reproduced by detecting reflected light from the recording medium 240. Alternatively, the reproducing-only head may be provided on the side opposite from the optical head 220 with the recording medium 240 in between, and information may be reproduced by detecting the light that passes through the recording medium 240.

The optical head 220 of the present embodiment is also applicable to a recording medium (medium for magnetic information reproducing) of a thermal assist magnetic recording scheme. In this case, the near-field light emitted by the optical head 220 is used to heat the recording medium, and information is magnetically recorded in the heated medium using a magnetic writing head integrated with the optical head 220. Note that, in this case, a head that detects the leakage flux from the medium using the magnetoresistance effect is separately provided as a reproducing-only head.

[Recording and Reproducing Operation]

The operation of the recording and reproducing apparatus 210 of the present embodiment is briefly described. First, the recording medium 240 inserted into the recording and reproducing apparatus 210 is mounted on the spindle 214, and the flying slider head 211 is placed over a predetermined position of the recording medium 240. The spindle 214 rotates the recording medium 240 at high speed to move the recording medium 240 at high speed relative to the flying slider head 211. As a result, air flow is generated between the recording medium 240 and the flying slider head 211, and the flying slider head 211 floats above the surface of the recording medium 240.

Here, by the elasticity of the suspension 212, the position of the slider main body 216 is adjusted in such a manner as to allow for relative movement with respect to the recording medium 240 with a predetermined amount of float above the recording medium 240. For example, the distance between the recording medium 240 and the surfaces of the conductive films 224 of the optical head 220 on the side of the recording medium 240 is maintained at 100 nm or less. Note that the near-field light emitted by the optical head 220 becomes weaker in intensity and the spot size of the light increases as the light travels away from the site of origin. It is therefore preferable that the distance between the recording medium 240 and the surfaces of the conductive films 224 on the side of the recording medium 240 be as small as possible. For example, the distance between the recording medium 240 and the conductive films 224 is preferably 10 nm or less.

After a predetermined distance is achieved between the slider main body 216 and the recording medium 240, the optical head 220 shines the near-field light on the recording medium 240 via the air layer to record and/or reproduce information. In the present embodiment, information is recorded and/or reproduced in and from the recording medium 240 using the near-field light produced by the optical device of the embodiment of the present invention in the manner described above.

In the present embodiment, because the near-field light is produced using the optical device of the embodiment of the present invention, information can be recorded and/or reproduced using the light of improved intensity and reduced spot size. Thus, with the recording and reproducing apparatus of the present embodiment, information can be recorded and/or reproduced more stably in higher density.

The example illustrated in FIGS. 42 and 43 described the optical device 222 of the configuration described in Second Embodiment. However, the present invention is not limited to this. For example, in the present embodiment, the optical devices described in First Embodiment and the Variations also can be used. The effect obtained in the present embodiment can also be obtained in this case.

Further, the present embodiment has been described through the case where the optical device of the embodiment of the present invention is applied to the optical head of the recording and reproducing apparatus. However, the present invention is not limited to this. For example, the optical device is also applicable to any optical apparatus that requires light of a micro spot size such as near-field light.

4. Fourth Embodiment

Fourth Embodiment describes an exemplary configuration in which the optical devices described in, for example, First and Second Embodiments and the Variations are applied to a photodetector (optical apparatus). Specifically, the following describes an exemplary configuration in which the optical device of the embodiment of the present invention is applied to a photodiode as proposed in, for example, Non-Patent Document 1.

[Configuration of Photodetector]

Figure 44:
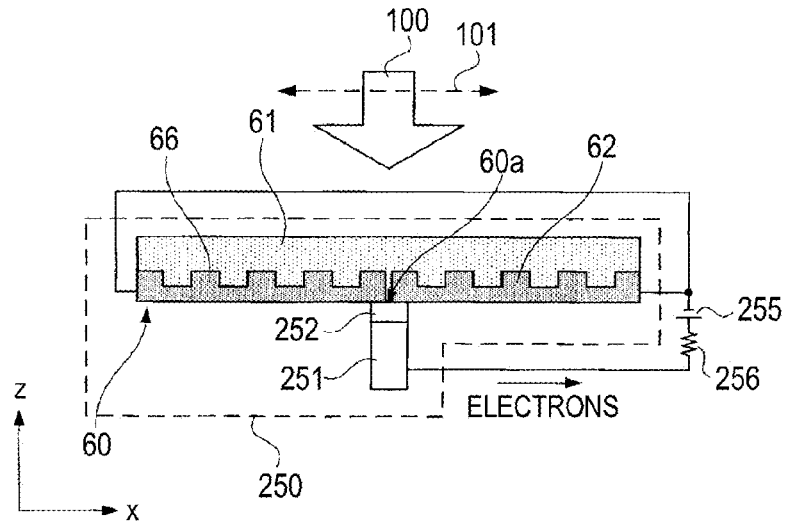
FIG. 44 is a diagram schematically illustrating a configuration of a photodetector according to Fourth Embodiment.
Figure 45:
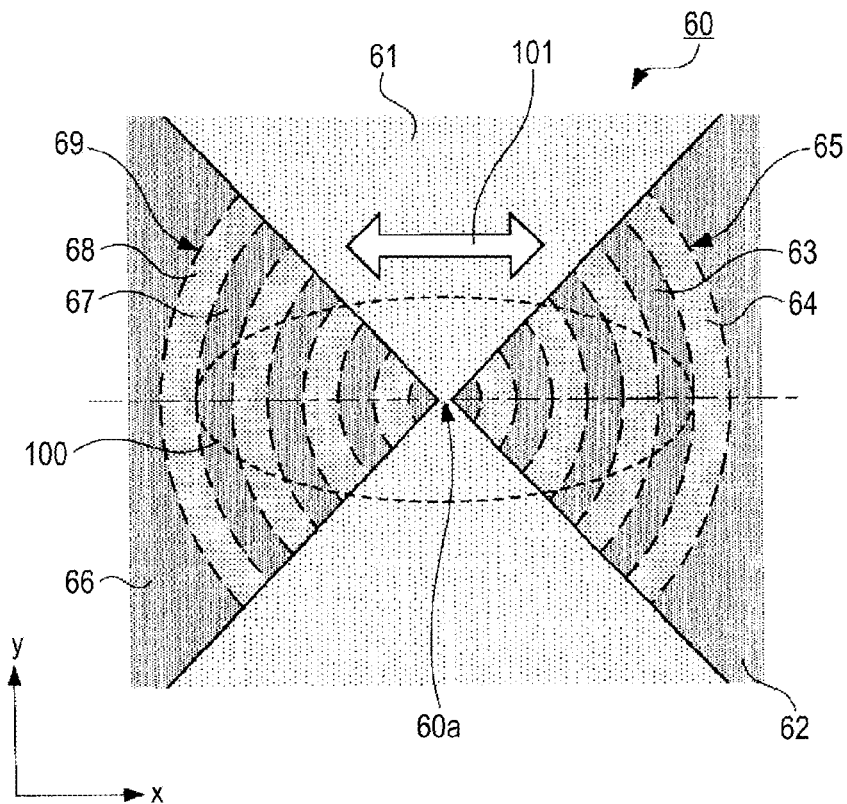
FIG. 45 is a schematic bottom view of an optical device used in the photodetector of Fourth Embodiment.

FIG. 44 illustrates a schematic configuration of a photodetector of the present embodiment. FIG. 45 is a schematic bottom view of the optical device of the embodiment of the present invention applied to the photodetector of the present embodiment.

A photodiode 250 (optical apparatus) of the present embodiment is configured to include mainly an optical device 60, a cathode electrode 251, and a Si (silicon) mesa structure portion 252 (light receiving section) formed between the optical device 60 and the cathode electrode 251.

In the present embodiment, the optical device of Second Embodiment is used as the optical device 60. As such, the configuration of the optical device 60 will not be described. Note that the first conductive film 62 and the second conductive film 66 of the optical device 60 serve as the anode electrode of the photodiode 250, and are connected to the minus terminal of a DC power supply 255 provided to apply reverse-bias voltage.

In the present embodiment, the incident light 100 incident on the optical device 60 is linearly-polarized light, and the direction of polarization is, as illustrated in FIGS. 44 and 45, along the opposing direction of the first conductive film 62 and the second conductive film 66 (x direction in FIGS. 44 and 45).

The cathode electrode 251 is the counter electrode of the first conductive film 62 and the second conductive film 66 of the optical device 60, and is connected to the plus terminal of the DC power supply 255 via a load resistor 256.

The Si mesa structure portion 252 is configured by joining two types of semiconductors, for example, such as in a PN junction. Photo irradiation of the junction region (active region) generates carriers therein for photoelectric conversion. In the present embodiment, the Si mesa structure portion 252 is disposed directly under a gap 60a between the first conductive film 62 and the second conductive film 66 of the optical device 60, in contact with the optical device 60, and performs photoelectric conversion by receiving the near-field light produced at the gap 60a of the optical device 60. The Si mesa structure portion 252 is sized to be smaller than the wavelength of the incident light 100.

[Operation and Effects of the Photodiode]

The operation of the photodiode 250 of the present embodiment is briefly described below. In the photodiode 250 of the foregoing configuration, irradiation of the optical device 60 with the incident light 100 produces near-field light in the vicinity of the gap 60a between the first conductive film 62 and the second conductive film 66. Here, the indentation patterns of a predetermined period formed on the surfaces of the first conductive film 62 and the second conductive film 66 on the side of the base 61 produce the surface plasmon enhancement effect, and high-intensity near-field light occurs in the vicinity of the gap 60a. Upon incidence of the near-field light on the active region of the Si mesa structure portion 252, carriers are generated in the Si mesa structure portion 252, and electrons flow from the cathode electrode 251 to the load resistor 256.

The photodiode 250 of the present embodiment of the foregoing configuration that operates in this manner has the following effects. Generally, photodiodes are configured by joining two types of semiconductors, for example, such as in a PN junction, and photoelectric conversion is performed by irradiating the junction region (active region) with light. There are two ways to increase the response speed in the photodiode:

(1) Reduce the travel time of the carriers to the electrode.
(2) Reduce the capacitance of the depletion layer.

To achieve Option (1), the thickness of the depletion layer needs to be reduced. However, simply reducing the thickness of the depletion layer increases the capacitance of the depletion layer, making it difficult to pursue Option (2). In other words, Options (1) and (2) are incompatible.

To achieve the two options at the same time, the thickness of the depletion layer needs to be reduced while reducing the size of the active region. However, reducing the size of the active region lowers sensitivity to light. Thus, in order to reduce the size of the active region to meet the requirements of the two options at the same time, a means to efficiently concentrate light on the narrow active region is needed.

In this connection, in the present embodiment, high-intensity near-field light of a micro spot size produced in the optical device 60 can be made incident on the active region of the Si mesa structure portion 252. Thus, the photodiode 250 of the present embodiment enables the light to be efficiently concentrated on even a narrow active region, and thus achieves the foregoing two options at the same time. The photodiode 250 of the present embodiment is therefore able to improve response speed without lowering sensitivity to light.

Further, the following effect can be obtained when, as illustrated in FIG. 45, linearly-polarized light is used as the incident light 100, and when the direction of polarization is along the opposing direction of the first conductive film 62 and the second conductive film 66. As described in the simulation analysis in Second Embodiment, the electric field strength of the near-field light produced by the optical device 60 of the present embodiment is greater than that when the near-field light is produced at the circular aperture (configuration of Comparative Example 1 or Non-Patent Document 1). Thus, in the present embodiment, higher intensity near-field light of a reduced spot size can be shone on the active region of the Si mesa structure portion 252, compared with the photodiode of the configuration proposed in, for example, Non-Patent Document 1.

In the optical device 60 used in the photodiode 250 of the present embodiment, the electric field strength of the near-field light varies depending on the direction of polarization of the incident light 100. That is, the response of the photodiode 250 of the present embodiment depends on the polarization direction of the incident light 100. By taking advantage of this, the photodiode 250 of the present embodiment can be used as a photodetector capable of detecting the polarization direction of the incident light 100 at very high speed.

In the present embodiment, as described above, light that has anisotropy in the direction of polarization can be used as the incident light. However, circularly polarized or randomly polarized incident light is also usable. The photodetector 250 of the present embodiment can be used as an ordinary photodetector even when the incident light does not have a unique polarization direction, as long as the following conditions are satisfied. For example, the photodetector 250 can be used as an ordinary photodetector when the condition $Ex_{ave}=Ey_{ave}$ is satisfied, where Ex in $Ex_{ave}$ is the electric field component in the opposing direction of the first conductive film 62 and the second conductive film 66, Ey in $Ey_{ave}$ is the electric field component perpendicular to the opposing direction of the first conductive film 62 and the second conductive film 66, and $Ex_{ave}$ and $Ey_{ave}$ are the time averages of the respective electric field components within a predetermined observation (light detection) time period.

In the example of FIGS. 44 and 45, the optical device 60 of Second Embodiment is applied to the photodiode 250. However, the present invention is not limited to this. For example, the present embodiment can use the optical devices described in First Embodiment and the Variations. The effects obtained in the present embodiment can also be obtained in this case.

Further, the present embodiment has been described through the case where the Si mesa structure portion 252 of the configuration prepared by joining two types of semiconductors, for example, such as in a PN junction is used as the emitted light receiving section of the optical device of the embodiment of the present invention. However, the present invention is not limited to this. Any light receiving mechanism can be used as long as it is capable of receiving the emitted light of the optical device, and converting the received light into electrical signals.

The present application contains subject matter related to those disclosed in Japanese Priority Patent Applications JP 2009-169344 and JP 2009-238114 filed in the Japan Patent Office on Jul. 17, 2009 and Oct. 15, 2009, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device comprising:
 a base that transmits incident light; and
 a first conductive film comprising a plurality of side portions formed on one surface of the base and that includes an indentation pattern of a predetermined period,
 wherein,
 a side portion defining an edge portion of the first conductive film that is irradiated with the incident light has a form of one of a protrusion and a straight line as viewed from a side from which the light is incident, and
 the indentation pattern is concentric with respect to an end portion of the edge portion of the first conductive film.

2. The optical device according to claim 1, wherein an origin of the predetermined period of the indentation pattern is the end portion of the edge portion.

3. The optical device according to claim 1, wherein the surface of the first conductive film opposite from the indentation pattern is flat.

4. The optical device according to claim 1, wherein the predetermined period of the indentation pattern is set so that surface plasmons produced on the surface of the indentation pattern upon incidence of the incident light on the first conductive film overlap in phase.

5. The optical device according to claim 1, wherein the length of the first conductive film along a direction orthogonal to a tangential direction at the end portion of the edge portion of the first conductive film is greater than a spot radius of the incident light on the first conductive film.

6. The optical device according to claim 1, wherein the indentation pattern has a cross section that has a shape of one of a rectangular-wave, a triangular wave, a sinusoidal wave, an arc-shaped protrusion, and an arc-shaped groove, or a cross section that has a shape of a combination of two or more of a rectangular-wave, a triangular wave, a sinusoidal wave, an arc-shaped protrusion, and an arc-shaped groove.

7. The optical device according to claim 1, wherein the incident light has anisotropy in a direction of polarization, and wherein the direction of polarization in which the incident light has a maximum electric field strength is a direction orthogonal to a tangential direction at the end portion of the edge portion of the first conductive film.

8. The optical device according to claim 1, further comprising:
a second conductive film formed on the one surface of the base and that includes an indentation pattern in a configuration identical to that of the first conductive film, wherein,
a side portion defining an edge portion of the second conductive film irradiated with the incident light has a form of one of a protrusion and a straight line as viewed from the a side from which the light is incident, and
an end portion of the edge portion of the second conductive film faces the end portion of the edge portion of the first conductive film with a predetermined distance in between.

9. The optical device according to claim 8, wherein the end portion of the first conductive film and the end portion of the second conductive film are separated from each other by a distance g, and wherein the relation g<λ is satisfied when λ is a wavelength of the incident light.

10. The optical device according to claim 1, wherein the first conductive film has a substantially rectangular profile on the surface provided with the indentation pattern, and wherein the width of an end portion of the first conductive film along a shorter side of the surface provided with the indentation pattern is shorter than the width in other regions of the first conductive film along the shorter side.

11. An optical apparatus comprising:
an optical device that includes a base that transmits incident light;
a conductive film comprising a plurality of side portions formed on one surface of the base and that includes an indentation pattern of a predetermined period, a side portion defining an edge portion of the conductive film that is irradiated with the incident light has a form of one of a protrusion and a straight line as viewed from a side from which the light is incident, the indentation pattern being concentric with respect to an end portion of the edge portion of the conductive film; and
a light source that emits the incident light disposed on a surface of the base of the optical device opposite from the conductive film.

12. An optical apparatus comprising:
an optical device that includes a base that transmits incident light;
a conductive film comprising a plurality of side portions formed on one surface of the base and that includes an indentation pattern of a predetermined period, a side portion defining an edge portion of the conductive film that is irradiated with the incident light has a form of one of a protrusion and a straight line as viewed from a side from which the light is incident, the indentation pattern being concentric with respect to an end portion of the edge portion of the conductive film; and
a light receiving section that receives the incident light emitted by the optical device.

* * * * *